(12) United States Patent
Goenka et al.

(10) Patent No.: US 11,425,763 B2
(45) Date of Patent: Aug. 23, 2022

(54) CLOUD HOSTED DEVICE INSTANCES METHOD AND APPARATUS

(71) Applicant: VERIZON PATENT AND LICENSING INC., Basking Ridge, NJ (US)

(72) Inventors: Mohit Goenka, Santa Clara, CA (US); Deepesh Mittal, Santa Clara, CA (US); Thanawat Kaewka, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 15 days.

(21) Appl. No.: 16/921,082

(22) Filed: Jul. 6, 2020

(65) Prior Publication Data
US 2022/0007437 A1  Jan. 6, 2022

(51) Int. Cl.
*H04W 76/10* (2018.01)
*H04L 67/52* (2022.01)
*H04L 67/141* (2022.01)
*H04W 4/029* (2018.01)

(52) U.S. Cl.
CPC .......... *H04W 76/10* (2018.02); *H04L 67/141* (2013.01); *H04L 67/18* (2013.01); *H04W 4/029* (2018.02)

(58) Field of Classification Search
CPC .... H04W 76/10; H04W 4/029; H04L 67/141; H04L 67/18; H04L 67/327; H04L 41/5051; H04L 67/2861; H04L 67/288; H04L 67/289; H04L 67/1004; H04L 43/0817; H04L 67/12; H04L 67/1025; H04L 67/102; H04L 61/1511; H04L 67/1008; H04L 67/02; H04L 67/1012
See application file for complete search history.

(56) References Cited

U.S. PATENT DOCUMENTS

| | | | |
|---|---|---|---|
| 2015/0046591 A1* | 2/2015 | Zhu | H04L 67/1002 709/226 |
| 2015/0296392 A1* | 10/2015 | Chen | H04W 72/0406 370/328 |
| 2020/0249039 A1* | 8/2020 | Lassoued | G06N 20/00 |
| 2021/0029586 A1* | 1/2021 | Zhu | H04W 28/12 |
| 2021/0136177 A1* | 5/2021 | Hall | H04L 67/327 |
| 2021/0212124 A1* | 7/2021 | Wakabayashi | G01S 19/25 |

* cited by examiner

*Primary Examiner* — Dai Phuong

(57) ABSTRACT

Disclosed are systems and methods for improving interactions with and between computers in hosting and/or providing systems supported by or configured with personal computing devices, servers and/or platforms. The systems interact to instantiate local and persistent core device instances within or across platforms, which can be used to improve the quality of data processing used in processing interactions between or among processors in such systems. The disclosed systems and methods provide systems and methods for cloud hosted device instances. The systems and methods provide a platform for creating cloud hosted device instances, each of which provides compute and memory resources for a device user. The systems and methods provide a core cloud service to centrally manage device data and deploy (and redeploy) local (or "lightweight") device instances close to a device.

20 Claims, 11 Drawing Sheets

CLOUD HOSTED DEVICE INSTANCES METHOD AND APPARATUS

FIELD OF THE DISCLOSURE

The present disclosure relates to improvements to cloud computing systems and specifically to providing cloud hosted device instances.

BACKGROUND

With current computing devices, such as a smartphone, tablet, laptop, etc., the functionality available to a user of the computing device is limited to the device's capabilities. For example, a user computing device's capabilities are limited by its finite compute and memory resources. In comparison to a smartphone (or tablet, laptop, etc.), a non-smartphone (also referred to as a basic or dumb phone) is even more limited in compute and memory resources and has even less capabilities as a result. User computing devices such as tablets and laptops typically have more compute and memory resources than a smartphone. Nonetheless, each of these devices has limited compute and memory resources.

In addition, a typical device user stores data (e.g., photographs, electronic messages, contacts, calendar, etc.) on the user's device. A problem arises when the device malfunctions or is stolen or misplaced. In most cases, the user is very likely to lose data stored on the device.

SUMMARY

The present disclosure provides novel systems and methods for cloud hosted device instances. The novel systems and methods provide a platform for creating cloud hosted device instances, each of which provides compute and memory resources for a device user. The novel systems and methods provide a core cloud service to centrally manage device data and deploy (and redeploy) local (or "lightweight") device instances close to a device.

Presently, a user computing device's capabilities are limited by the device's finite compute and memory resources. In comparison to a smartphone (or tablet, laptop, etc.), a non-smartphone (also referred to as a basic or dumb phone) is even more limited in compute and memory resources and has even less capabilities as a result. User computing devices such as tablets and laptops typically have more compute and memory resources than a smartphone. Nonetheless, each of these devices has limited compute and memory resources. The cloud hosted device instances provide more capabilities for use by a user device. A cloud hosted device instance provides compute and memory resources over and above those provided by a user computing device. The cloud-hosted device instance affords a user computing device additional capabilities.

In addition, the cloud hosted device instance that is provided for use by a user computing device is a local device instance hosted by an edge cloud server of a cellular base station servicing the geographic area in which the user computer device is located. As a result latency issues are avoided and reliability (e.g., network transmission reliability) is optimized. As the user computing device migrates from one cellular base station to a second cellular base station, the local device instance is migrated to an edge cloud server of the second cellular base station. As a result, latency and reliability issues can continue to be avoided despite movement of the user's device from one geographic area (or cell) to another.

According to some embodiments, the disclosed systems and methods first receive a request for a device instance from a user device (e.g., a mobile user device). The request can include information specifying the amount of compute and memory resources for allocation for the device instance as well as which applications the user wishes to access via the device instance. The request may be received by a core cloud server of a core cloud component comprising a number of core cloud servers. In response to the received request, a persistent core device instance is created in accordance with the specifications provided by the user in the received request.

The disclosed systems and methods then generate a unique identification (e.g., a token) for the user device. For example, the unique identification may be a random hash of information associated with the user and/or the user device, such as one or more of an international mobile equipment identity (IMEI), media access control (MAC) address, cell phone number, etc.

The disclosed systems and methods then identify an edge cloud server of an edge cloud component comprising a number of edge cloud servers. Each edge cloud server may be a component of (and be located at) a cellular base station (or cell site) of a mobile (e.g., cellular) network with which the user device is communicating. In accordance with at least one embodiment, the edge cloud server is identified at least in part in accordance with the physical geographic location of the user device. For example, the edge cloud server is identified as the edge cloud server associated with the cellular base station currently servicing the geographic area in which the user device is currently located. By way of a further non-limiting example, the user device's geographic location can be determined using some or all of a physical geographic information provided by the user device, using information identifying the cellular base station with which the user device communicated the request, etc.

In accordance with one or more embodiments, the edge cloud server can be identified using Quality-of-Service (QoS) considerations. In other words and in accordance with at least one embodiment, edge cloud server selection involves balancing the local device instance load across edge cloud servers in order to optimize QoS outcomes. In accordance with at least one embodiment, with respect to an edge cloud server, QoS refers to the overall performance (e.g., including availability and reliability) of the edge cloud server to provide the local device instance service to the user of the user device. For example, each local device instance hosted by an edge cloud server uses resources (e.g., compute, memory, network bandwidth, etc. resources) of the edge cloud server. As the resource load increases at an edge cloud server, the likelihood that the QoS offered by an edge cloud server is negatively impacted increases. For example, QoS provided by an edge cloud server can be negatively impacted as the edge cloud server reaches a certain number (e.g., a threshold capacity number) of local device instances. To further illustrate, even in a case that the number of local device instances has not reached a capacity level for a given edge cloud server, the resource capacity of the edge cloud server can be negatively impacted due to the resource demands of the local device instances currently being hosted by the edge cloud server. In other words, the resource demands of one or more local device instances can negatively impact the QoS for other local device instances (e.g., existing or newly-added local device instances).

The disclosed systems and methods can be used to balance the load for QoS as well as other purposes. For example, a number of candidate edge cloud servers can be identified as servicing a geographic area including the current geographical location of the user device, and an edge cloud server that is able to provide at least a threshold QoS level is selected from the number of identified edge cloud servers. In accordance with one or more embodiments, the selection considers the proximity of the user device to each edge cloud server. For example, an order of consideration can be based on a proximity of each edge cloud server (of the number of candidate edge cloud servers) to the user device. Using this exemplary ordering, the edge cloud server closest to the current geographic location of the user device is considered first, with the next geographically closest edge cloud server being considered next, and so on until an edge cloud server is identified that is able to provide at least a threshold QoS. As discussed herein, QoS management can result in a local device instance being moved from one edge cloud server to another edge cloud server that is able to provide a better QoS (e.g., even in a case that the user device has not changed its geographical location).

In accordance with one or more embodiments, the core cloud server maintains information (e.g., a current QoS snapshot) that can be used in identifying each edge cloud server's current load and/or QoS indicators. Examples of QoS-related information that can be maintained about each edge cloud server by the core cloud server include without limitation the number of local device instances currently being hosted by the edge cloud server, a threshold capacity number of local device instances, network bandwidth usage, a threshold network capacity, processor allocation, a threshold processor allocation capacity, processor usage, a threshold processor usage capacity, memory allocation, a threshold memory allocation capacity, memory usage, a threshold memory usage capacity, etc. A threshold can be used with a corresponding actual allocation, usage, etc. to determine whether or not an edge cloud server is reaching a level (e.g., a capacity level) that can impact QoS such that the edge cloud server is not a candidate to host a new local device instance and/or that a number of local device instances currently being hosted by the edger server are to be moved to one or more other edge cloud servers with more capacity.

In accordance with at least one embodiment, each edge cloud server maintains its own QoS-related information and periodically provides a snapshot of its QoS-related information to the core cloud server. In some cases, an edge cloud server can periodically provide a snapshot of its QoS-related information to the core cloud server as well as other edge cloud servers (e.g., other edge cloud servers within a certain geographic proximity). The core cloud server can use the QoS-related information associated with an edge cloud server in selecting an edge cloud server to host a local device instance. Each edge cloud server can use its own QoS-related information in determining whether or not it is able to host a new local device instance (or needs to request that another edge cloud server take one or more local device instances currently being hosted by the edge cloud server). An edge cloud server can use another edge cloud server's QoS-related information to determine whether the other edge cloud server is capable of providing at least a threshold QoS for a local device instance currently being hosted by the edge cloud server .

In some cases, the core cloud server and the edge cloud server can be jointly involved in determining whether or not the edge cloud server is able to host a new device instance. For example, the core cloud server uses its QoS-related information or snapshot (associated with the edge cloud server) to determine that an edge cloud server appears to have sufficient capacity to provide at least a threshold QoS, while the identified edge cloud server has more recent QoS-related information indicating that the edge cloud server is not capable of hosting the new local device instance. In such a case, the edge cloud server may decline a request to host the local device instance and provide the core cloud server with its most recent QoS-related information (e.g., the QoS-related information collected by the edge cloud server since the last periodic update sent to the core cloud server).

The disclosed systems and methods then instruct the identified edge cloud server to create a local device instance in accordance with the specifications provided by the user in the received request. In accordance with at least one embodiment, the instruction includes the token identifying the user device. The local device instance can be associated with the token received with the instruction. The disclosed systems and methods then transmit a connection request to the user device with the token in response to the instance creation request.

The disclosed systems and methods then establish a connection between the user device and the edge cloud server, such that the user device is able to access the local device instance to perform a number of actions. For example, the user device transmits input received from a user at the user device. The transmitted input can be used to generate a rendering of a display for an application of a device instance (e.g., a local device instance or a persistent core device instance). The display can be sent to the user device for display at the user device by the device instance. The amount of processing performed by the device instance can be based on the capabilities of the user device. In accordance with one or more embodiments, an action requested by the user device can be processed by the edge cloud server using the local device instance, by the core cloud server using the persistent core device instance or some combination.

In accordance with one or more embodiments, the local device instance and the corresponding persistent core device instance can be synchronized such that the persistent core device instance reflects the current state of the local device instance. For example, the edge cloud server transmits a synchronization request (or instruction) to the core cloud server in response to any changes to data being used by the local device instance. For example, the data can be transient or persistent data being used by the local device instance. The request can identify the updates to be made as well as the token identifying the persistent core device instance.

The disclosed systems and methods can determine that another edge cloud server is more suited to host the local device instance than the edge cloud server currently hosting the local device instance. For example, the determination can be based on one or more of QoS considerations, cellular base station service areas, etc. The disclosed systems and methods can monitor the current state (e.g., the hosting edge cloud server's QoS snapshot, the current location of the user device, etc.) to detect a change in condition or state (e.g., detection of a QoS issue, movement of the user device from a first cellular base station to a second cellular base station, etc.) In response to a change, (e.g., a decrease in QoS at the hosting edge cloud server, change in location by the user device to the geographic area of the second cellular base station, etc.), the disclosed systems and methods can cause a local device instance to be created at another edge cloud server (e.g., a second edge cloud server) at another cellular base station. In accordance with some embodiments, the core cloud server transmits a token associated with the user device along with an instruction to the second edge cloud server to create a local device instance for servicing the user device while the user device remains in the geographic area of the second cellular base station. In accordance with some embodiments, the first edge cloud server transmits a token associated with the user device along with its local device instance and an instruction to the second edge cloud server to create a local device instance for servicing the user device while the user device remains in the geographic area of the second cellular base station. The first edge cloud server can be instructed to (or can elect to) terminate its local device instance (e.g., in the absence of new requests from the user device).

In accordance with one or more embodiments, a method is disclosed which includes receiving, at a server computer, a device instance creation request in connection with a user device, the request comprising configuration information; creating, by the server computer, a persistent core device instance in accordance with the configuration information; identifying, by the server computer and using information indicating a geographic location of the user device, an edge cloud server of a cellular base station associated with a geographic area including the geographic location of the user device; transmitting, by the server computer and to the identified edge cloud server, an instruction to instantiate a local device instance in accordance with the configuration information; transmitting, by the server computer and to user device, an instruction to make a connection with the identified edge cloud server; receiving, by the server computer and from the edge cloud server, a synchronization request comprising information identifying a change in the local device instance; updating, by the server computer, the persistent core device instance in accordance with the information received from the edge cloud server; and responding, by the server computer, to a change in condition indicating an edge cloud server change for the user device.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for cloud hosted device instances.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DRAWINGS

The above-mentioned features and objects of the present disclosure will become more apparent with reference to the following description taken in conjunction with the accompanying drawings wherein like reference numerals denote like elements and in which.

Figure 9:
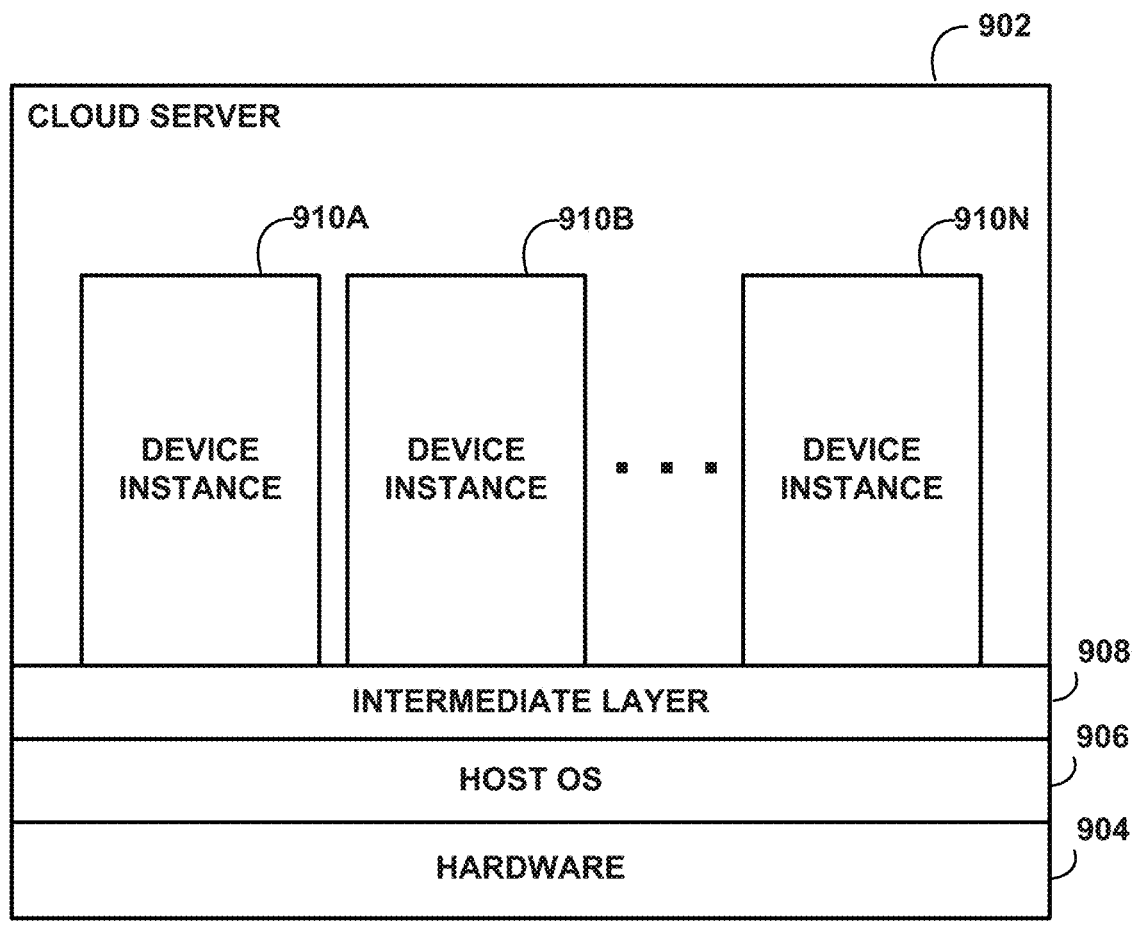
Figure 10:
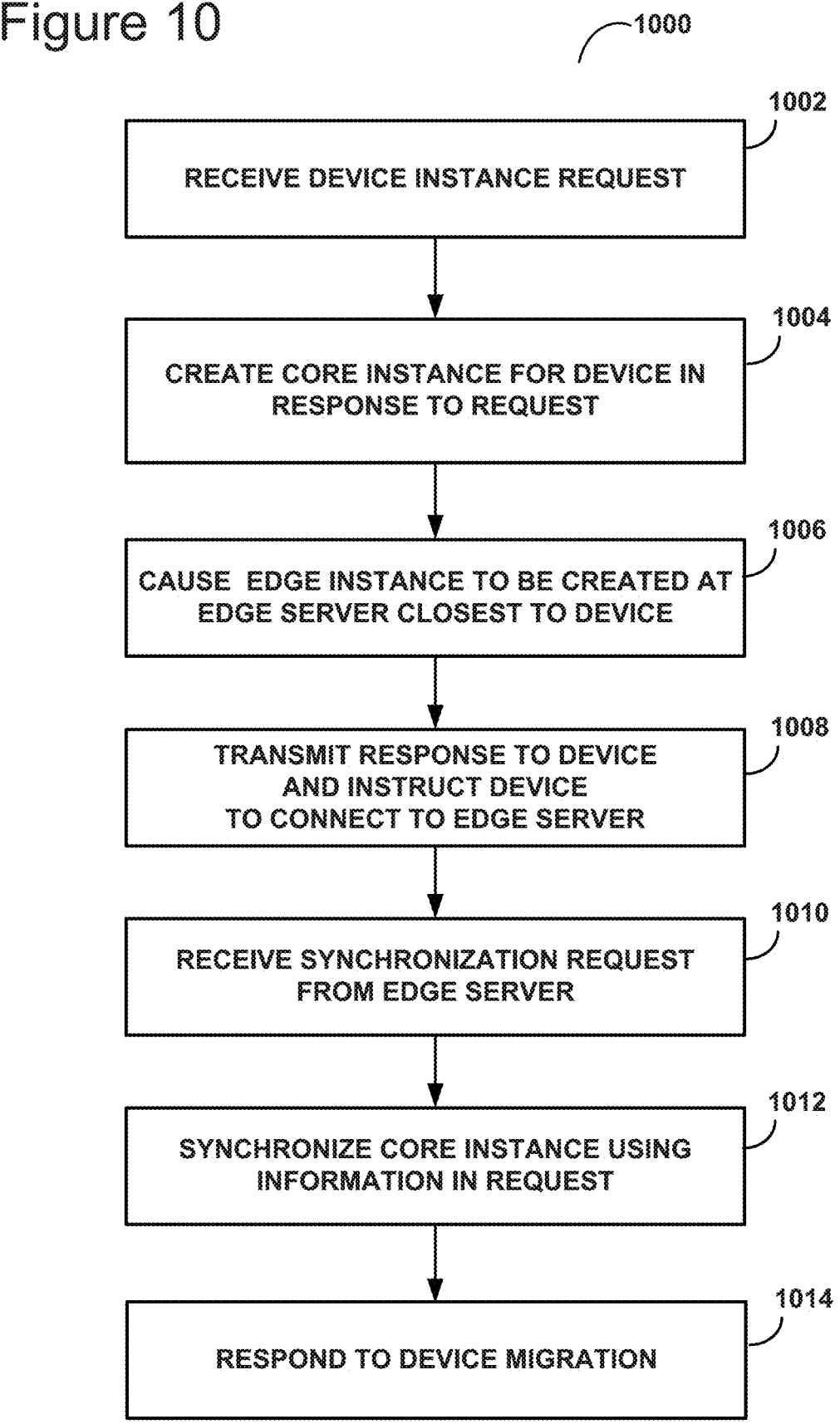
Figure 11:
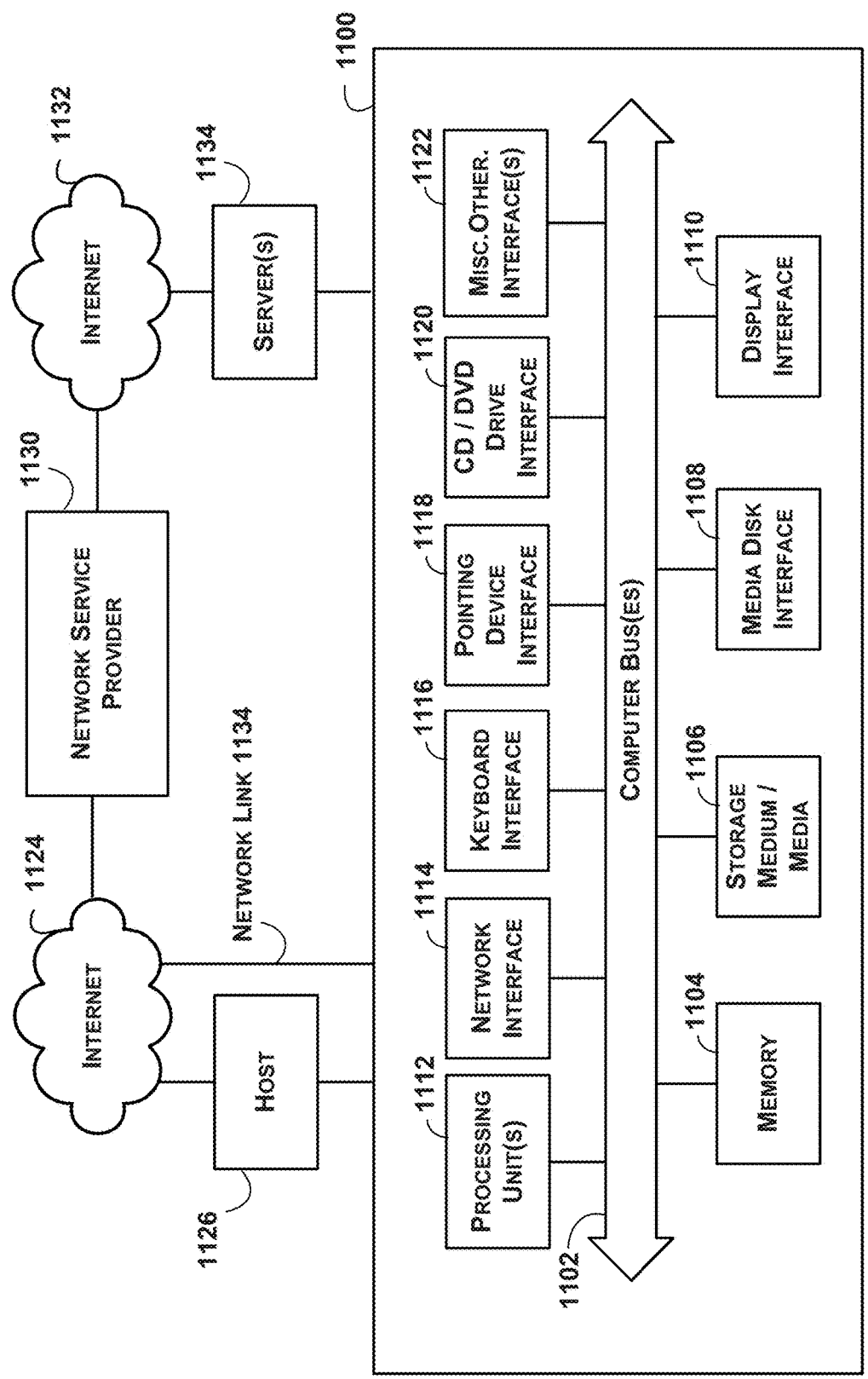

FIGS. 4-8 provide process flow overview in accordance with embodiments of the present disclosure;

FIG. 9 is a schematic diagram illustrating an example of a cloud server in accordance with embodiments of the present disclosure;

FIG. 10 is a flowchart illustrating steps performed in accordance with some embodiments of the present disclosure; and FIG. 11 is a block diagram illustrating the architecture of an exemplary hardware device in accordance with one or more embodiments of the present disclosure.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, 4th or 5th generation (2G, 3G, 4G or 5G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo!® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing or displaying various forms of content, including locally stored or streamed video, or games (such as fantasy sports leagues). The foregoing is provided to illustrate that claimed subject matter is intended to include a wide range of possible features or capabilities.

The detailed description provided herein is not intended as an extensive or detailed discussion of known concepts, and as such, details that are known generally to those of ordinary skill in the relevant art may have been omitted or may be handled in summary fashion.

The present disclosure provides novel systems and methods for cloud hosted device instances. The novel systems and methods provide a platform for creating cloud hosted device instances, each of which provides compute and memory resources for a device user. The novel systems and methods provide a core cloud service to manage device data and instances and deploy (and redeploy) local (or "lightweight") device instances on an edge cloud server (e.g., an edge cloud server closest to a device and/or an edge cloud server capable of providing a threshold QoS).

Figure 1:
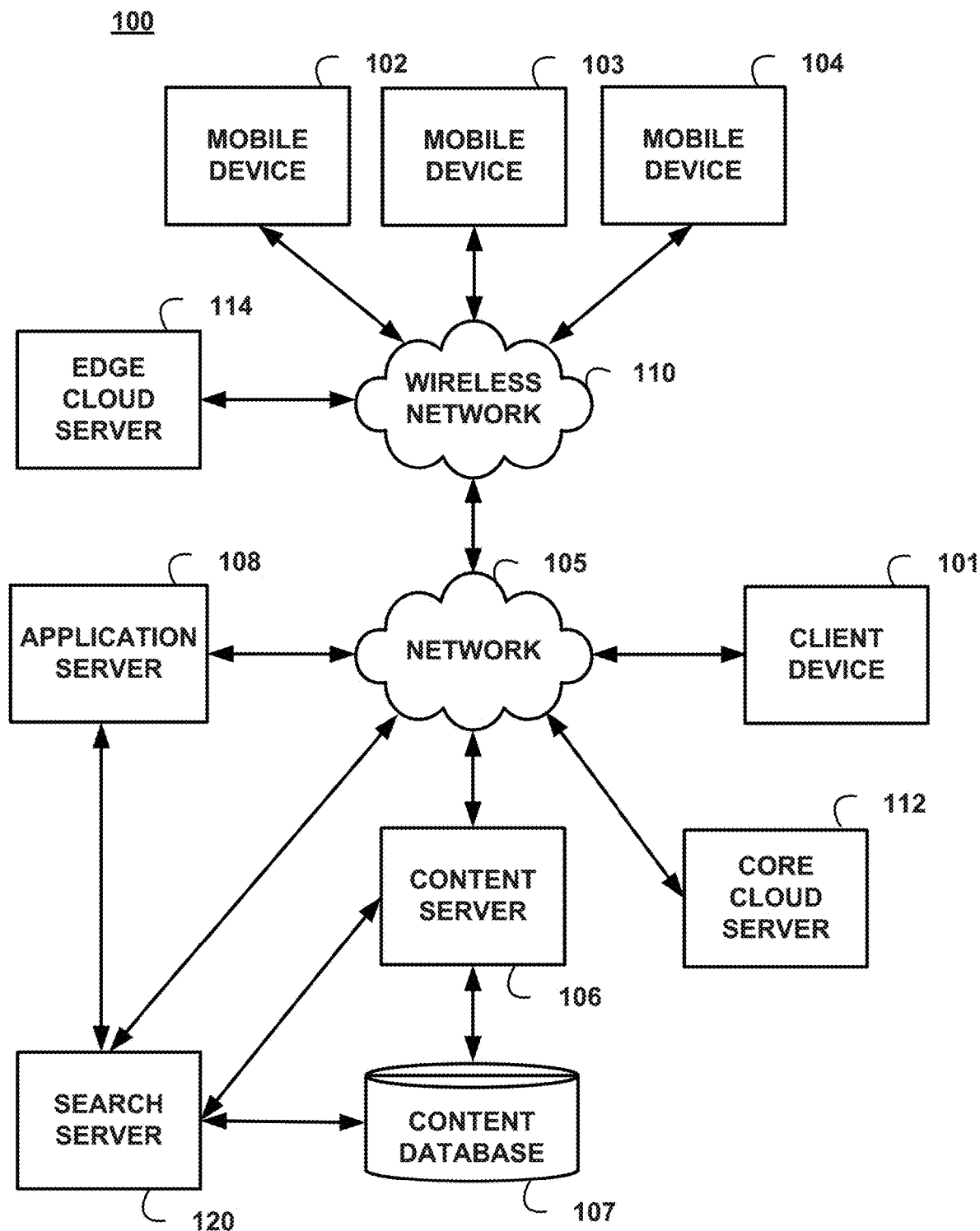
FIG. 1 is a schematic diagram illustrating an example of a network within which the systems and methods disclosed herein could be implemented according to some embodiments of the present disclosure.

Certain embodiments will now be described in greater detail with reference to the figures. The following describes components of a general architecture used within the disclosed system and methods, the operation of which with respect to the disclosed system and methods being described herein. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as, by way of non-limiting examples, content server 106, application (or "App") server 108, search server 120 and advertising ("ad") server (not shown).

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, non-smart phones (e.g., basic or dummy phones), display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, mobile networks (e.g., cellular networks), and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as acquaintances, friends, family, colleagues, or co-workers, which are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site or service, such as streaming media site/service (e.g., YouTube®), an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a video application and/or video platform, can be provided via the application server 108, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

An ad server comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

In accordance with at least one embodiment, core cloud server 112 and edge cloud server 114 are configured to provide a cloud hosted device instance service for user devices (e.g., mobile devices 102-104, client device 101, etc.) registered with the service. Generally, the core cloud server 112 manages user device data and persistent core device instances for registered user devices, performs tasks, facilitates handoffs between edge cloud servers 114, etc. In accordance with at least one embodiment, the edge cloud server 114 is a component of (and be located at) a cellular base station (or cell site) of a mobile (e.g., cellular) network with which a registered user device is communicating. By way of a non-limiting example, the edge cloud server 114 can be a part of an edge cloud component comprising a number of edge cloud servers.

The edge cloud server 114 can provide compute and memory resources to the cell tower. The edge cloud server 114 can host a local device instance (also referred to herein as a "lightweight" device instance) providing localized cloud computing capability to a user device. By way of a non-limiting example, the local device instance can receive user input via the user device (e.g., touchscreen input of the user at the user device), process the user input and transmit rendering instructions to the user device causing the user device to update the user device's display. In some cases, the edge cloud server 114 forwards a task to the core cloud server 112 to perform. By way of a non-limiting example, a task forwarded to the core cloud server 112 may need compute and/or memory resources not available at the edge cloud server 114.

In accordance with at least one embodiment, a local device instance maintained (or hosted) by the edge cloud server 114 can be synchronized with a corresponding persistent core device instance maintained by the core cloud server 112. By way of one non-limiting example, the edge cloud server 112 transmits device instance updates to the core cloud server 112, or vice versa, as needed. The core cloud server 112 can update a persistent core device instance using the update(s) received from the edge cloud server 114, or vice versa.

By way of some non-limiting examples, a device instance (e.g., a local device instance or a persistent core device instance) can be a virtual machine or a virtual container that provides compute and memory resources to a user device (e.g., mobile device 102, 103 or 104) configured to interact with the device instance. By way of a non-limiting example, the user device can be configured with a cloud client application (e.g., a shell container) which communicates with the device instance.

Servers 106, 108, 112, 114 and 120 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108 and/or 120. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a streaming video application (e.g., YouTube®, Netflix®, Hulu®, iTunes®, Amazon Prime®, HBO Go®, and the like), blog, photo storage/sharing application or social networking application (e.g., Flickr®, Tumblr®, and the like), can be hosted by the application server 108 (or content server 106, search server 120 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120, or an ad server or ad network.

Moreover, although FIG. 1 illustrates servers 106, 108, 112, 114 and 120 as single computing devices, respectively, the disclosure is not so limited. For example, one or more functions of servers 106, 108,112, 114 and/or 120 may be distributed across one or more distinct computing devices. Moreover, in one embodiment, servers 106, 108, 112, 114 and/or 120 may be integrated into a single computing device, without departing from the scope of the present disclosure.

Figure 2:
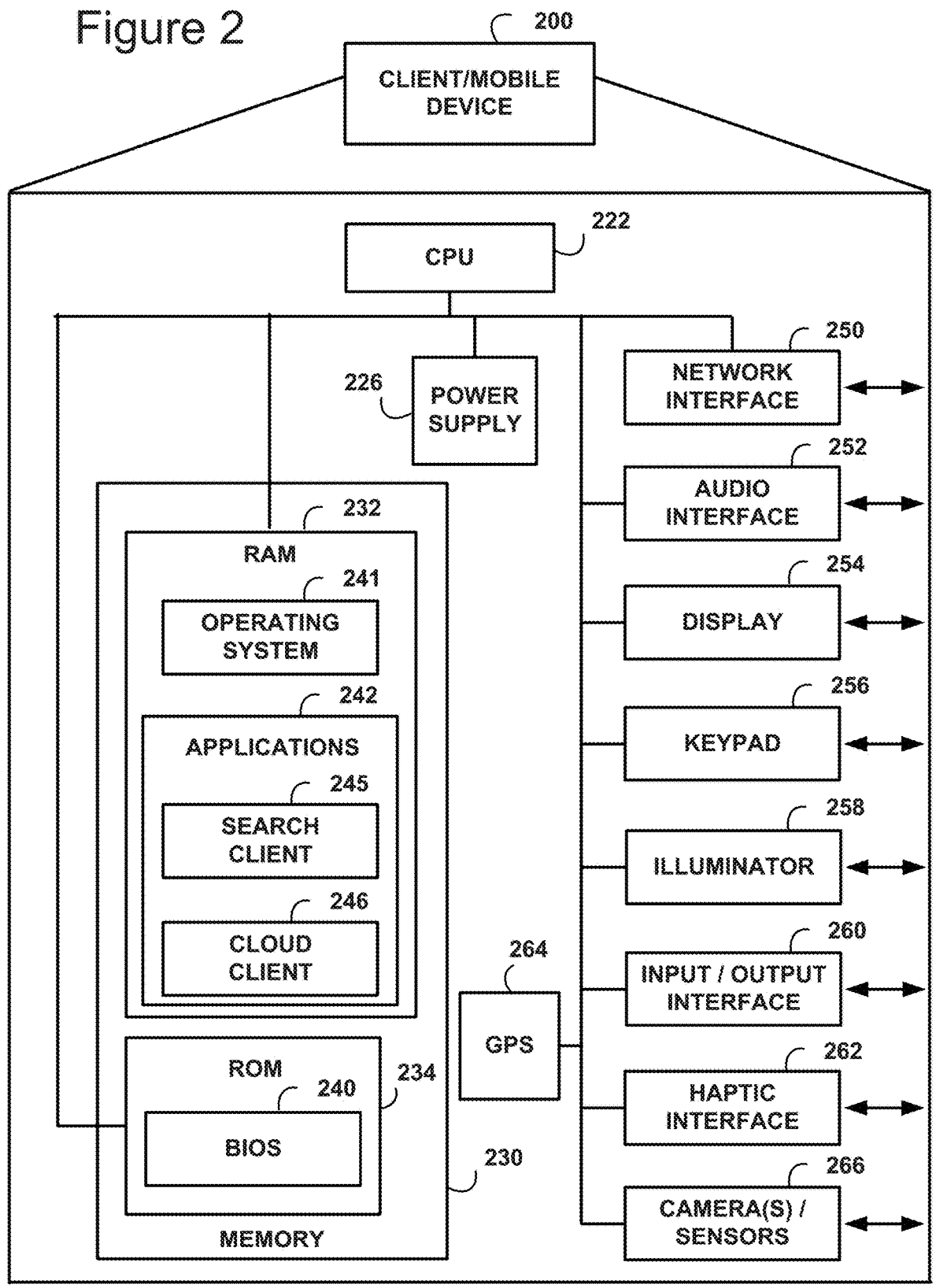
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Device 200 may include many more or less components than those shown in FIG. 2. However, the components shown are sufficient to disclose an illustrative embodiment for implementing the present disclosure. Device 200 may represent, for example, the mobile and client devices discussed above in relation to FIG. 1.

As shown in the figure, device 200 includes a processing unit (CPU) 222 in communication with a mass memory 230 via a bus 224. Device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to device 200. A rechargeable or non-rechargeable battery may be used to provide power. The power may also be provided by an external power source, such as an AC adapter or a powered docking cradle that supplements and/or recharges a battery.

Device 200 may optionally communicate with a base station (not shown), or directly with another computing device. Network interface 250 includes circuitry for coupling device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Device 200 also comprises input/output interface 260 for communicating with external devices, such as a headset, or other input or output devices not shown in FIG. 2. Input/output interface 260 can utilize one or more communication technologies, such as USB, infrared, BluetoothTM, or the like. Haptic interface 262 is arranged to provide tactile feedback to a user of the client device. For example, the haptic interface may be employed to vibrate device 200 in a particular way when the device 200 receives a communication from another user.

Optional GPS transceiver 264 can determine the physical coordinates of device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of device 200 on the surface of the Earth. It is understood that under different conditions, GPS transceiver 264 can determine a physical location within millimeters for device 200; and in other cases, the determined physical location may be less precise, such as within a meter or significantly greater distances. In one embodiment, however, device 200 may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of device 200. The mass memory also stores an operating system 241 for controlling the operation of device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by device 200 to store, among other things, applications 242 and/or other data. For example, data stores may be employed to store information that describes various capabilities of device 200. The information may then be provided to another device based on any of a variety of events, including being sent as part of a header during a communication, sent upon request, or the like. At least a portion of the capability information may also be stored on a disk drive or other storage medium (not shown) within device 200.

Applications 242 may include computer executable instructions which, when executed by device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving advertisements, IMs, emails, and other types of known messages, or the like.

In the example shown in FIG. 2, applications 242 further include a cloud client application (or cloud client) 246 configured to enable device 200 to interact with the edge cloud server 114 and/or the core cloud server 112. In accordance with one or more embodiments, the cloud client 246 may be a shell container capable of being installed on a variety of user device platforms. In accordance with one or more embodiments, a container (e.g., a shell container) can comprise an application and associated library that may be executed by a runtime engine and a host operating system.

Figure 3:
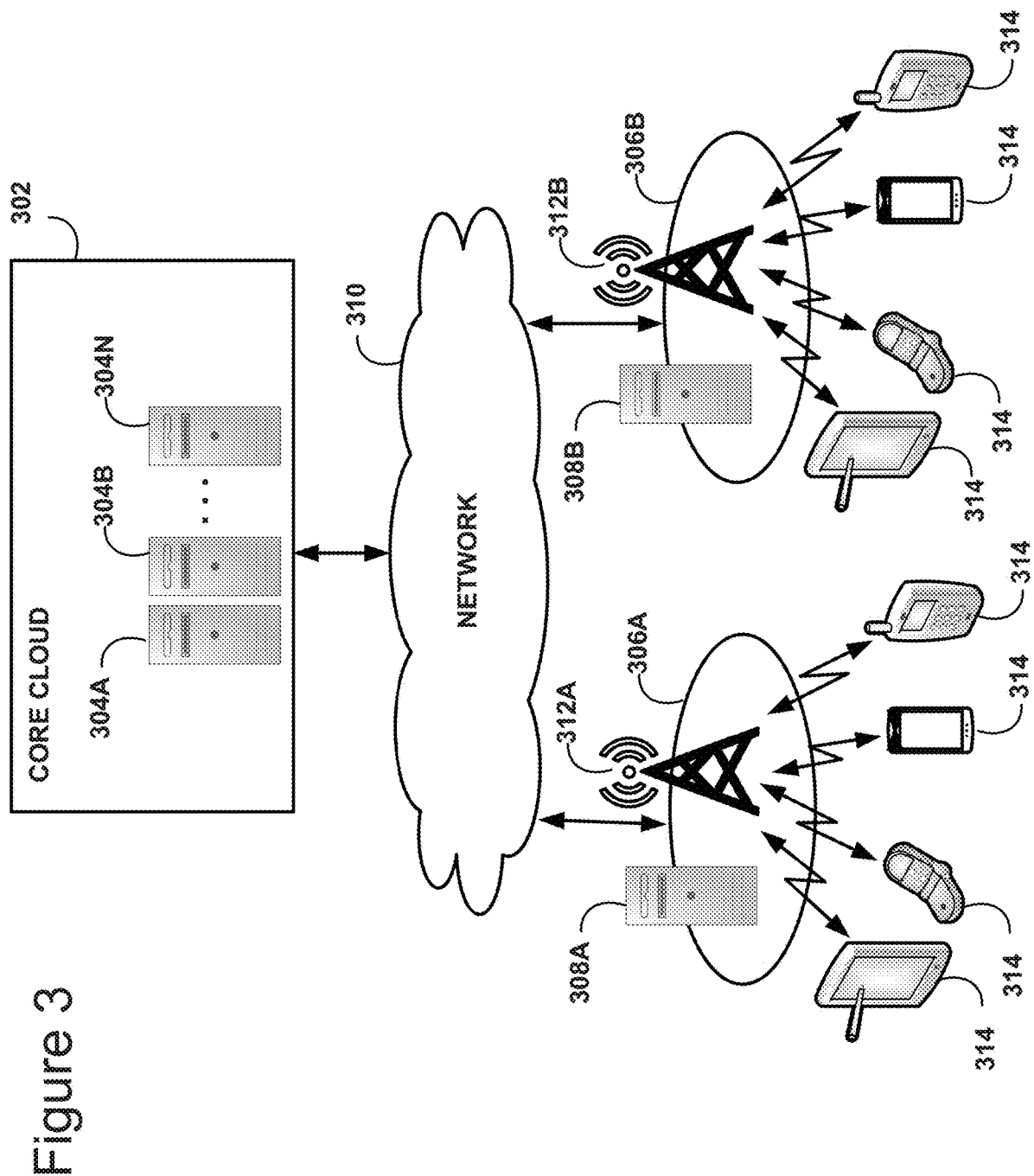
FIG. 3 is a schematic block diagram illustrating components of an exemplary system in accordance with embodiments of the present disclosure.

FIG. 3 is a block diagram illustrating components of a cloud hosting environment used within the disclosed systems and methods. FIG. 3 includes a core cloud 302, cellular base stations (or cell sites) 306A and 306B, user devices 314 and network 310. The core cloud 302 and edge cloud servers 306A and 306B are configured to provide a cloud hosted device instance service for user devices (e.g., mobile devices 102-104, client device 101, user device 314, etc.) registered with the service.

The core cloud 302 comprises a number of server computing devices 304A-304N (also referred to herein as core cloud servers). Generally, the core cloud 302 manages user device data and persistent core device instances for registered user devices, performs tasks, facilitates handoffs between edge cloud servers 114, etc. In the example shown in FIG. 3, each edge cloud server (e.g., edge cloud server 306A, edge cloud server 306B, etc.) is a component of a cellular base station (or cell site), and provides compute and memory resources to the cell base station. In addition to an edge cloud server, cellular base stations 306A and 306B include a base transceiver station (BTS) 312A and 312B, respectively. User device(s) 314 can communicate with an edge cloud server (e.g., server 308A or 308B) and/or core cloud 302 via a BTS (e.g., BTS 312A, BTS 312B, etc.) of a cellular base station (e.g., station 306A, station 306B, etc.) in a mobile network. Cellular base stations 306A and 306B can be components of wireless network 110 (as an example of a mobile network) and network 310 can correspond to network 105, for example.

In accordance with at least one embodiment, an edge cloud server (e.g., server 114, 308A, 308B, etc.) can host a local device instance (or "lightweight" device instance) providing localized cloud computing capability to a user device (e.g., user device 314, mobile device 102, 103 or 104, client device 101, etc.). By way of a non-limiting example, the local device instance receives user input via the user device (e.g., touchscreen input of the user at the user device), process the user input and transmit rendering instructions to the user device causing the user device to update the user device's display. In some cases, the edge cloud server forwards a task to a core cloud server 112 to perform. By way of a non-limiting example, a task forwarded to a core cloud server of the core cloud 302 uses compute and/or memory resources not available at the edge cloud server.

A local device instance maintained by an edge cloud server (e.g., the edge cloud server 308A or 308B) can be synchronized with a corresponding persistent core device instance maintained by the core cloud 302 (e.g., a core cloud server of the core cloud 302). By way of one non-limiting example, an edge cloud server (e.g., the edge cloud server 308A or 308B) transmits device instance updates to the core cloud 302, or vice versa, as needed. The core cloud 302 can update a persistent core device instance using the update(s) received from an edge cloud server (e.g., the edge cloud server 308A or 308B), or vice versa.

A device instance (e.g., a local device instance or a persistent core device instance) can be a virtual machine or a virtual container that provides compute and memory resources to a user device (e.g., user device 314, mobile device 102, 103 or 104, client device 101, etc.) configured (e.g., using cloud client 246) to interact with the device instance. Each cloud server (e.g., core cloud servers 304A-304N, edge cloud servers 308A and 308B, etc.) can be a physical server computer that can be divided into multiple virtual servers, or device instances, using virtualization software (e.g., VMWare®, Parallels®, Hyper-V®, etc.).

In accordance with one or more embodiments, a user device can be configured with a cloud client (e.g., cloud client 246) which communicates with one or more device instances (e.g., a local device instance and/or a persistent core device instance). A user device's cloud client can be pre-installed in the user device. Alternatively, the cloud client can be downloaded (e.g., from the core cloud 302). By way of a non-limiting example, the cloud client can be downloaded as part of a device instance launch process.

Figure 4:
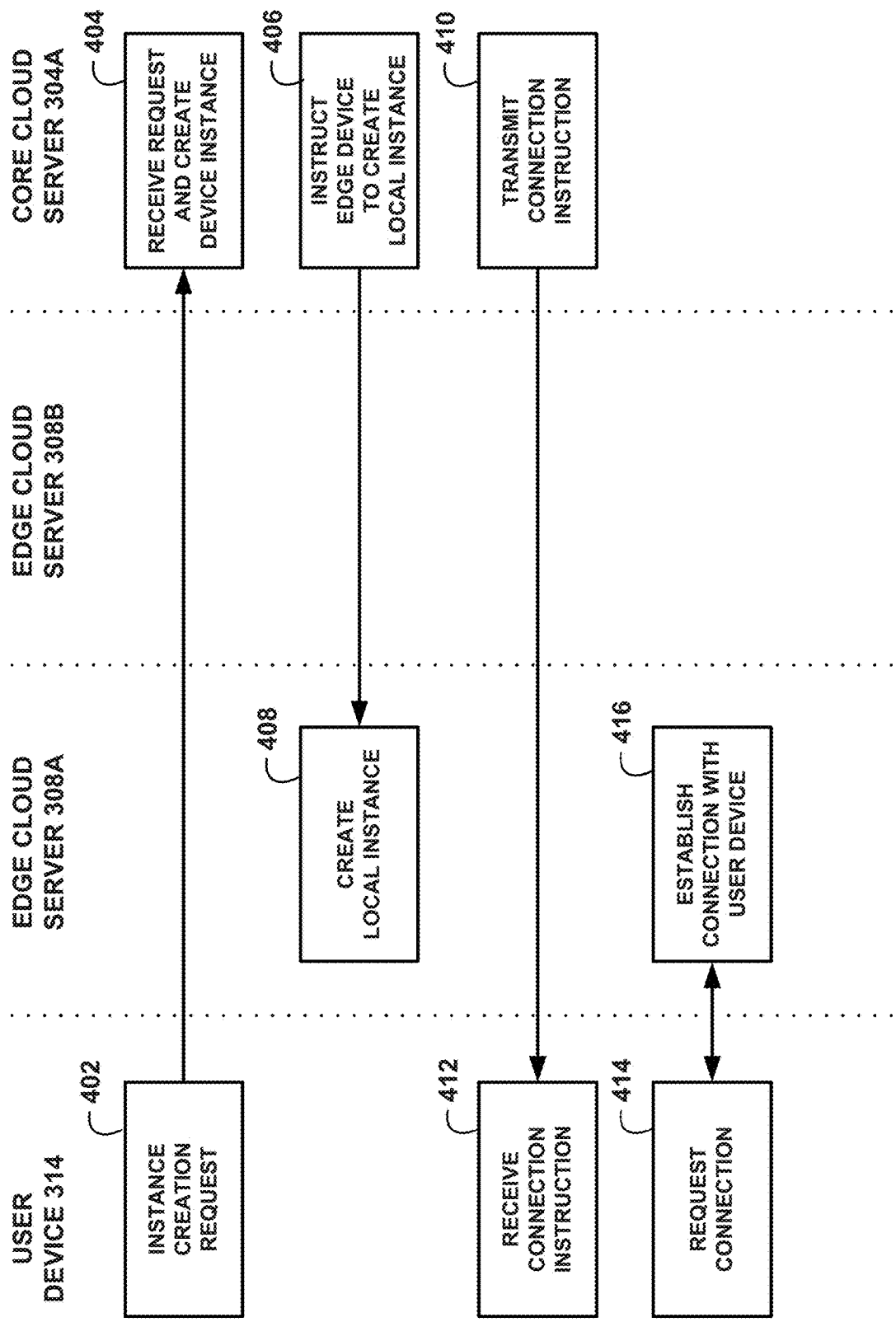

FIG. 4 provides a device instance launch process flow overview in accordance with one or more embodiments of the present disclosure. At block 402, user device 314 transmits an instantiation request to the core cloud 302, which is received by core cloud server 304A. For example, the request by the user is a request to create a new device instance (with a user-selected configuration, such as is discussed herein), a request access to an existing device instance, a request to access an existing device instance with a modified configuration, etc. In accordance with one or more embodiments, a user of user device 314 might use a browser application executing on the user device 314 and a universal resource locator (URL) corresponding to a website of the core cloud 302 to access the core cloud 302 and make the request. In accordance with one or more embodiments, the website can comprise one or more webpages that present a number of options for configuring the device instance, including different resource levels (e.g., a number of different compute and memory configurations, applications, etc.). As yet another example, the cloud client executing on the user device 314 can be used to transmit the request in response to input from the user. In any case, the device instance creation request can be transmitted to the core cloud server 304A. The request can be transmitted to the core cloud server 304A via cellular base station 306A and network 310, for example.

In the example shown in FIG. 4, core cloud server 304A receives the device instance creation request from user device 314 at block 404. The request can include information about the user as part of a user registration, such as the user's name, address, login (e.g., online username and password), as well as device information, such as an international mobile equipment identity (IMEI), media access control (MAC) address, geographic location, cell phone number, etc. In addition, the device instance creation request can identify a requested resource level, which can indicate a level (or tier) of compute and memory resource requested by the user. The login can be used by the user to subsequently access the user's device instance.

At block 404, core cloud server 304A generates a unique identifier (or token) associated with the user and user device 314 and creates a persistent core device instance for the user and associated with the unique identifier. By way of a non-limiting example, the unique identifier (or token) can be random hash of information, where such information can include one or more of the IMEI, MAC address, cell phone number, etc. of the user device 314.

At block 406, core cloud server 304A identifies an edge cloud server (e.g., edge cloud server 308A in the example), and transmits the token and an instruction instructing the edge cloud server 308A to create a local device instance associated with the token. The core cloud server 304A can identify edge cloud server 308A using information received with the request (e.g., information identifying edge cloud server 308A) to select edge cloud server 308A. By way of a non-limiting example, the request received at block 404 includes information indicating which cellular base station (e.g., cellular base station 306A or 306B) was used by the user device 314 to communicate the request at block 402. By way of another non-limiting example, the request received at block 404 includes information indicating the device's geographic location at the time the request was transmitted at block 402. By way of a further non-limiting example, the request received at block 404 includes information indicating which cellular base station (e.g., cellular base station 306A or 306B) was used by the user device 314 to communicate the request at block 402 as well as information indicating the device's geographic location at the time the request was transmitted at block 402.

In accordance with at least one embodiment, the edge cloud server 308A can be identified as the edge cloud server associated with the cellular base station (e.g., cellular base station 306A or 306B) currently servicing the geographic area in which the user device is currently located. The user device's geographic location can be determined using some or all of a physical geographic information provided by the user device, using information identifying the cellular base station with which the user device communicated the request, etc.

In accordance with one or more embodiments, Quality-of-Service (QoS) can be taken into consideration in identifying an edge cloud server. In other words and in accordance with at least one embodiment, edge cloud server selection can involve balancing the local device instance load across edge cloud servers in order to optimize QoS outcomes. With respect to an edge cloud server, QoS can refer to the overall performance (e.g., including availability and reliability) of the edge cloud server to provide the local device instance service to the user of the user device. For example, each local device instance hosted by an edge cloud server can use resources (e.g., compute, memory, network bandwidth, etc. resources) of the edge cloud server. As the resource load increases at an edge cloud server, the likelihood that the QoS offered by an edge cloud server is negatively impacted increases. For example, QoS provided by an edge cloud server can be negatively impacted as the edge cloud server reaches a certain number (e.g., a threshold capacity number) of local device instances. To further illustrate, even in a case that the number of local device instances has not reached a capacity level, the resource capacity of an edge cloud server can be negatively impacted due to the demands of the local device instances currently being hosted by the edge cloud server. In other words, the resource demands of one or more local device instances can negatively impact the QoS for other local device instances (e.g., existing or newly-added local device instances).

In accordance with at least one embodiment, a load balancing approach can be used for QoS as well as other purposes. For example, a number of candidate edge cloud servers can be identified as servicing a geographic area including the current geographical location of the user device, and an edge cloud server that is able to provide at least a threshold QoS level can be selected from the number of identified edge cloud servers. In accordance with one or more embodiments, the selection considers the proximity of the user device to each edge cloud server. For example, an order of consideration (of the number of candidate edge cloud servers) can be based on a proximity of each edge cloud server (of the number of candidate edge cloud servers) to the user device. Using this exemplary ordering, the edge cloud server closest to the current geographic location of the user device is considered first, with the next geographically closest edge cloud server being considered next, and so on until an edge cloud server is identified that is able to provide at least a threshold QoS. As discussed herein, QoS management can result in a local device instance being moved from one edge cloud server to another edge cloud server that is able to provide a better QoS (e.g., even in a case that the user device has not changed its geographical location).

In accordance with one or more embodiments, the core cloud server (e.g., the core cloud server 304A) maintains information (e.g., a current QoS snapshot) that can be used in identifying each edge cloud server's current load and/or QoS indicators. Examples of QoS-related information that can be maintained about each edge cloud server (e.g., cellular base station 306A or 306B) by the core cloud server 304A can include without limitation a number of local device instances currently being hosted by the edge cloud server, a threshold capacity number of local device instances, network bandwidth usage, a threshold network capacity, processor allocation, a threshold processor allocation capacity, processor usage, a threshold processor usage capacity, memory allocation, a threshold memory allocation capacity, memory usage, a threshold memory usage capacity, etc. A threshold can be used with a corresponding actual allocation, usage, etc. to determine whether or not an edge cloud server is reaching a level (e.g., a capacity level) that can negatively impact QoS such that the edge cloud server is not a candidate to host a new local device instance and/or that a number of local device instances currently being hosted by the edger server are to be moved to one or more other edge cloud servers with more capacity.

In accordance with at least one embodiment, each edge cloud server (e.g., the edge cloud server 308A, 308B, etc.) maintains its own QoS-related information and periodically provides a snapshot of its QoS-related information to the core cloud server (e.g., the core cloud server 304A). In some cases, an edge cloud server can periodically provide a snapshot of its QoS-related information to the core cloud server as well as other edge cloud servers (e.g., other edge cloud servers within a certain geographic proximity). The core cloud server 304A can use the QoS-related information associated with an edge cloud server (e.g., the edge cloud server 308A, 308B, etc.) in selecting an edge cloud server to host a local device instance. Each edge cloud server (e.g., the edge cloud server 308A, 308B, etc.) can use its own QoS-related information in determining whether or not it is able to host a new local device instance (or needs to request that another edge cloud server take one or more local device instances currently being hosted by the edge cloud server). An edge cloud server (e.g., the edge cloud server 308A) can use the QoS-related information of another edge cloud server (e.g., the edge cloud server 308B) to determine whether the edge cloud server 308B is capable of providing at least a threshold QoS for a local device instance currently being hosted by the edge cloud server's 308A.

In some cases, the core cloud server 304A and the edge cloud server (e.g., 308A) can be jointly involved in determining whether or not the edge cloud server 308A is able to host a new device instance. For example, the core cloud server 304A uses its QoS-related information or snapshot (associated with the edge cloud server 308A) to determine that the edge cloud server 308A appears to have sufficient capacity to provide at least a threshold QoS, while the edge cloud server 308A has more recent QoS-related information indicating that the edge cloud server 308A is not capable of hosting the new local device instance. In such a case, the edge cloud server 308A can decline a request to host the local device instance and provide the core cloud server 304A with its most recent QoS-related information (e.g., the QoS-related information collected by the edge cloud server 308A since the last periodic update sent to the core cloud server 304A).

In accordance with at least one embodiment, the local device instance can be a lighter weight device instance than the persistent core device instance. For example, in some cases the edge cloud server 308A can have a more limited amount of resources to allocate to the user device 314 than the core cloud server 304A. As yet another example, the local device instance might be intended for use with a specific application thereby only requiring a lightweight device instance. By way of a non-limiting example, the local device instance creation request can be transmitted to edge cloud server 308A via network 310.

At block 410, the core cloud server 304A transmits a connection instruction with the token generated at block 404 and information identifying the edge cloud server 308A (selected at block 406) to the user device 314. The identification information can comprise a URL identifying the edge cloud server 308A, for example. The connection instruction can be communicated to the user device 314 via the network 310 and the cellular base station 306A, for example.

At block 412, the user device 314 receives the connection instruction. At block 414, the user device 414 transmits a connection request with the token to edge cloud server 308A (e.g., using the URL of the edge cloud server 308A received at block 412 from the core cloud server 304A.

At block 416, the edge cloud server 308A receives the connection request from the user device 314, uses the token included with the received connection request to associate the user device 314 with the local device instance created at block 408. The edge cloud server 308A can transmit a response indicating the result of the request (e.g., a successful connection) to the user device 314. If successful, the compute and memory resources of the local device instance are available to the user device 314 and the user device 314 can commence interaction with the local device instance at edge cloud server 308A.

Figure 5:
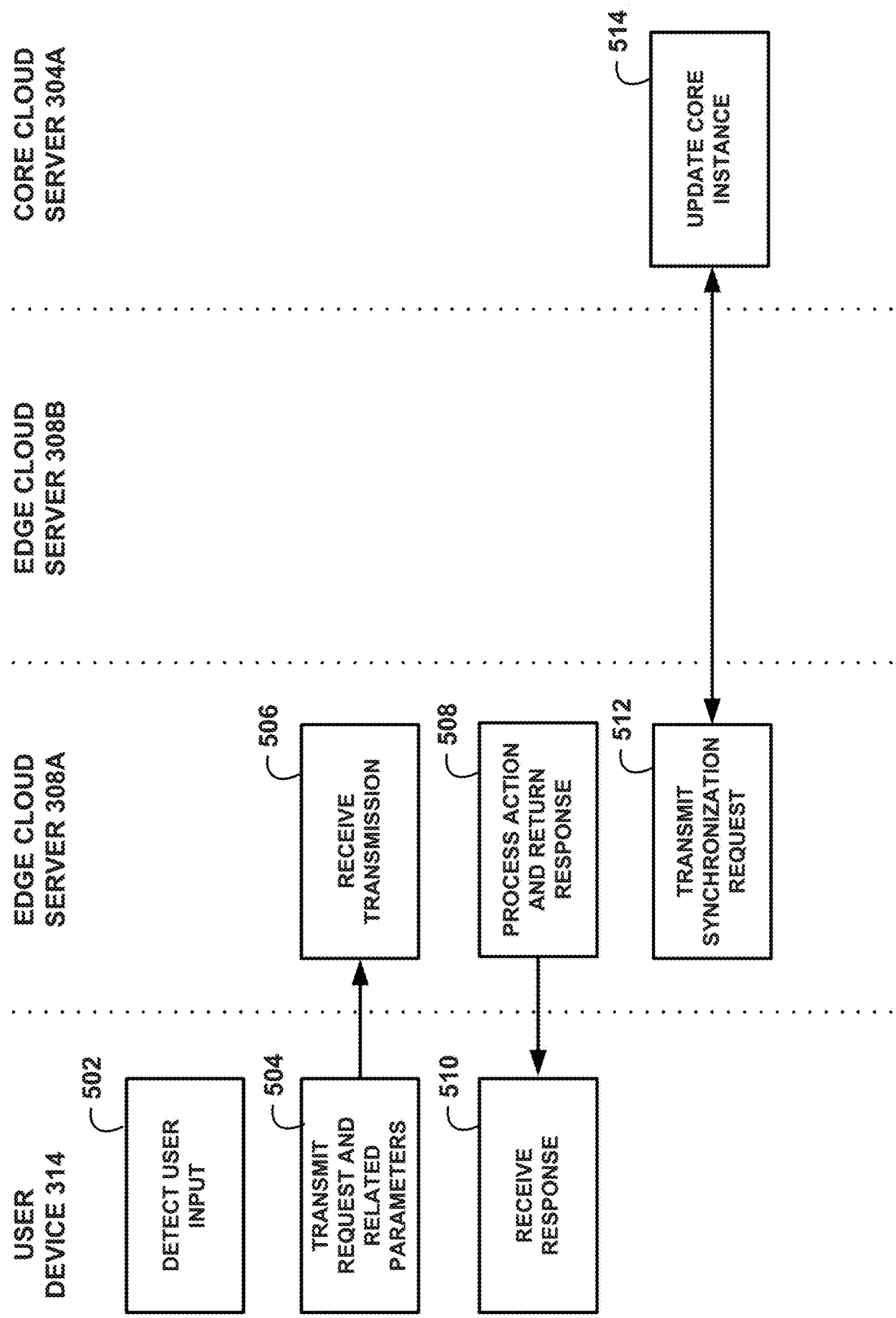

FIG. 5 provides a device instance interaction process flow overview in accordance with one or more embodiments of the present disclosure. In the example of FIG. 5, user input at the user device 314 is detected by the user device 314 at block 502 (e.g., detected by the cloud client 246 executing at the user device 314). By way of a non-limiting example, the user input can be selection of a button associated with an application (e.g., an electronic mail, text messaging, calendar, contacts, etc. application). By way of some further non-limiting example, the detected user input can comprise touch screen input, keypad input, audio input, etc.

At block 504, the cloud client 246 executing at the user device 314 can transmit a request for service in response to the detected user input to the edge cloud server 308A. The request can comprise the token as well as any related parametric information. The related parametric information can depend on the level of processing capability of the user device 314. For example, a non-smartphone (or basic or dummy phone) detects the user input as touchscreen coordinates indicating the location of the user's touch input (e.g., corresponding to a button or icon selection) on a pixel grid of touchscreen of the user device 314. In such a case, the parametric information can comprise the touchscreen coordinates. As yet another example and in the case of a smartphone, the smartphone recognizes that the touchscreen coordinates correspond to a specific button (or icon) selection by the user, and might communicate the button selection to the edge cloud server 308A as parametric information related to the request.

The edge cloud server 308A receives the token with the request at block 506. At block 508, the edge cloud server 308A uses the token received with the request to identify the local device instance associated with the user device 314, uses the identified local device instance to process the received request and return a response to the user device 314. For example and in the case of a dummy device, the local device instance can use the touchscreen coordinates transmitted with the request to determine the meaning of the input (e.g., which button was selected by the user) and process the input. By way of a further non-limiting example, assume that the input is determined to be user selection invoking an electronic mail (email) application, the local device instance can render an initial screen for the email application and forward the rendering to the user device 314 for output at a display of the user device 314.

As yet another example, in the case of a smartphone, the local device instance can receive the parametric information indicating that the user selection represents invocation of an email application and the local device instance can access the user's stored email messages and provide the user device 314 with email message data that the user device 314 can use to render the email application's initial display screen.

In accordance with one or more embodiments, the edge cloud server 308A and core cloud server 304A operate to maintain synchronicity between the local device instance maintained by the edge cloud server 308A and the persistent core device instance maintained by the core cloud server 304A. At block 512, the edge cloud server 308A transmits a request to update the persistent core device instance corresponding to the user device 314. For example, the edge cloud server can transmit a synchronization request (or instruction) to the core cloud server in response to any changes to data being used by the local device instance. For example, the data can be transient and/or persistent data being used by the local device instance. The request can identify the updates to be made as well as the token identifying the persistent core device instance. Alternatively or in addition, the core cloud server 304A can identify updates to be made to the persistent core device instance as a result of the communication from the edge cloud server 308A.

At block 514, the core cloud server 304A can use the token to identify the persistent core device instance associated with the user device 314, make the updates indicated by the request, and then return a response to the edge cloud server 308A. The response can include any updates that the edge cloud server 308A may need to make to the local device instance to maintain synchronicity.

As a result, the persistent core device instance (corresponding to the user device 314) reflects any changes made to the local device instance (corresponding to the user device 314) at the edge cloud server 308A, and vice versa. Synchronicity facilitates migration (discussed herein) of the local device instance to another edge cloud server (e.g., the edge cloud server 308B) in response to the physical movement by the user device 314 from one geographic area serviced by one edge cloud server (e.g., the edge cloud server 308A) to another geographic area serviced by another edge cloud server (e.g., the edge cloud server 308B). In addition, synchronicity facilitates persistence of a device instance associated with the user device 314. In accordance with at least one embodiment, the core cloud 302 maintains a core device instance that is persistent and reflects any updates made by an edge cloud server to a local device instance.

In the example shown in FIG. 5, the request transmitted by the user device 314 to the edge cloud server 308A is handled by the edge cloud server 308A using the local device instance associated with the user device 314. In some cases, the request can, to at least some extent, be beyond the capabilities of the edge cloud server 308A. In which case, the edge cloud server 308A can request action by the core cloud server 304A. Along these lines, FIG. 6 provides another device instance interaction process flow overview in accordance with one or more embodiments of the present disclosure.

Figure 6:
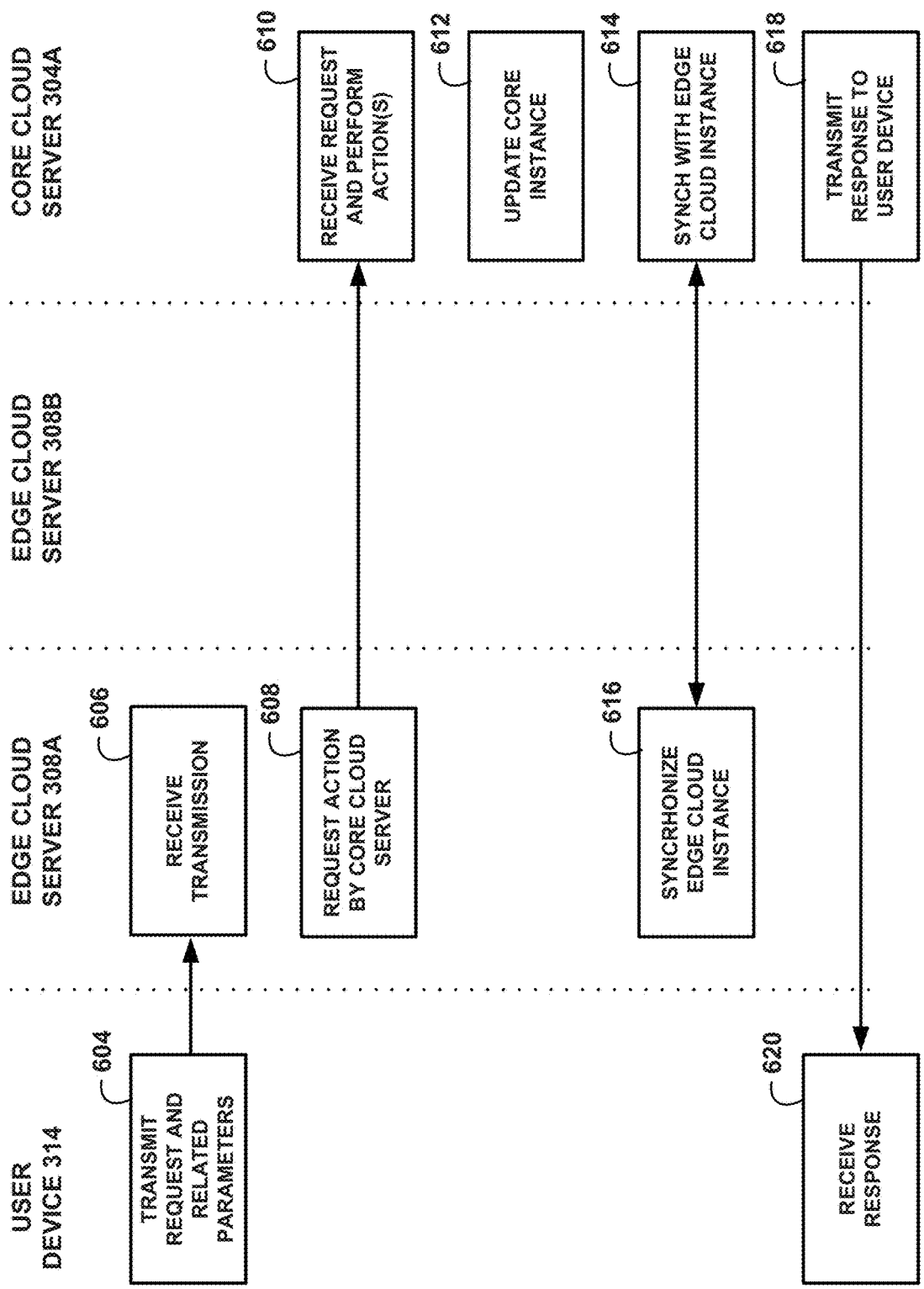

Blocks 604 and 606 of FIG. 6 correspond (respectively) to blocks 504 and 506 of FIG. 5. As with block 504 (of FIG. 5), block 604 (of FIG. 6) can occur in response to user input detection (e.g., such as at block 502 of FIG. 5). At block 608, the edge cloud server 308A determines to request action by the core cloud server 304A in order to respond to the request received at block 606 from the user device 314. By way of one non-limiting example, the edge cloud server 308A can determine that the received request involves a resource (or resources) that are missing from the edge cloud server 308A, such as an application that is missing from the local device instance or compute or memory capability that is missing from the edge cloud server 308, etc. By way of a further non-limiting example, the request can involve some database application processing that is unavailable at the edge cloud server 308A. By way of yet a further non-limiting example, the request can involve a network request that cannot be performed by the edge cloud server 308A. By way of another non-limiting example, the request can involve data (e.g., user data) that is unavailable at the edge cloud server 308A.

At block 610, the core cloud server 304A receives the request and performs one or more actions in response. At block 612, the core cloud server 304A updates the persistent core device instance and then synchs with the edge cloud server 308A and the local device instance maintained by the edge cloud server 308A at blocks 614 and 616. At block 618, the core cloud server 304A transmits a response to the user request (transmitted at block 604) to the user device 314. The user device 314 receives the response at block 620.

In the example shown in FIG. 6, the core cloud server 304A transmits a response to the user device 314. Alternatively, the edge cloud server 308A can transmit at least some portion of the response to the user device 314. By way of a non-limiting example, the edge cloud server 308A processes some portion of the request in accordance with its capabilities and requests assistance from the core cloud server 304A for any remaining portion. In such a case, the edge cloud server 308A transmits its result alone or in combination with the results generated by the core cloud server 304A. As yet another non-limiting example, the core cloud server 304A can transmit its response to the edge cloud server (e.g., at block 614) and the edge cloud server 308A (rather than the core cloud server 304A) can transmit the response to the user device 314 at block 620. It should be apparent from these examples that various combinations of the core cloud server 304A and the edge cloud server 308A responding to a request received from the user device 314 are possible using the novel systems and methods disclosed herein.

As discussed, the user device 314 can be a mobile device that is capable of physically moving from one cellular base station to another. By way of a non-limiting example, the physical location of user device 314 can move from a geographic area (e.g., a cell) serviced by cellular base station 306A to the geographic area (e.g., a cell) serviced by the cellular base station 306B. In such a case, the disclosed systems and methods cause the local device instance to move with the user device 314 from the edge cloud server 308A (at the cellular base station 306A) to the edge cloud server 308B (at the cellular base station 306B).

In accordance with at least one embodiment, device instance migration makes use of existing cell movement capabilities provided by cellular base stations, including the handoff (or handover) switching process used by cellular base stations. By way of a non-limiting example, as the user device 314 moves from one cell to another, a mobile network transceiver (e.g., a component of network interface 250) can switch from the current cell's frequency (or channel) to another cell's frequency (or channel). The range of a cell can depend on the area in which the cell is located. For example, in an urban area, a cell's range can be approximately half a mile and a rural cell's range can extend to as much as five miles (or more in an open area). As the user device 314 moves from one cell to another, it can search for a new channel (associated with a cellular base station).

In accordance with one or more embodiments, the user device 314 can send physical location information (e.g., generated by GPS 264) to the current edge cloud server (e.g., server 308A). At block 702, the edge cloud server 308A (as part of the cellular base station 306A currently providing mobile network access to the user device 314) can use the location information received from the user device 314 alone or in combination with mobile network channel assignment information to determine that the user device 314 may have or may be on the verge of changing to another cellular base station (e.g., cellular base station 306B).

At block 704, the edge cloud server 308A requests action by the core cloud server 304A. The request can include the latest physical geographic location received by the edge cloud server 308A from the user device 314. The request can also include mobile network information identifying another cellular base station to which the user device 314 may be (or already has been assigned).

At block 708, the core cloud server 304A uses the information received from the request to identify another edge cloud server (e.g., the edge cloud server 308B) and instruct the edge cloud server 308B to create a local device instance for the user device 314. Since the persistent core device instance is in synchronicity with the local device instance at the edge cloud server 308A, the core cloud server 304A can use the persistent core device instance to facilitate creation of the local device instance at the edge cloud server 308B. The creation (or instantiation) instruction is sent (at block 708) with a unique identifier (e.g., a token) for the user device 314 by the core cloud server 304A. The core cloud server 304A may optionally regenerate the token associated with the user device 314 (e.g., for security purposes). The new token can be different from the previous token used with the edge cloud server 308A, for example.

At block 710, the edge cloud server 308B creates a local device instance for the user device 314, associates the local device instance with the received token and provides a response to the core cloud server 304A indicating the success of the operation. At block 712, the core cloud server 304A transmits a connection instruction to the user device 314 identifying the edge cloud server 308B (e.g., with a URL of the server 308B) and instructing the user device 314 to redirect its communications from the edge cloud server 308A (e.g., the current and soon to be previous edge cloud server) to the edge cloud server 308B (e.g., the new edge cloud server and soon to be the current edge cloud server). The core cloud server 304A can send the token (e.g., the new token) to the user device 314 at block 712.

At block 714, the user device 314 receives the instruction. In response and at block 716, the use device 314 transmits a connection request with the token received from the core cloud server 304A (e.g., the token received with the transmission at block 714) to the edge cloud server 308B. At block 718, the edge cloud server 308B establishes the connection and provides a response to the user device 314. At this point, the edge cloud server 308B is established as the edge cloud server servicing the user device 314 using the local device instance created by the edge cloud server 308B at block 710. The user device 314 need no longer communicate with the edge cloud server 308A.

Eventually (e.g., after a threshold time), the edge cloud server 308A can terminate its connection with the user device 314 and remove its local device instance associated with the user device 314. The timing of this operation can be based on an amount of time since the edge cloud server 308A has received a request from the user device 314. The absence of requests from the user device 314 for a threshold period of time can trigger the termination of the connection and the removal of the local device instance. In accordance with one or more embodiments, as part of the termination operation, the edge cloud server 308A can send some or all of the local device instance to the core cloud server 308A for storage and or synchronization purposes.

Figure 7:
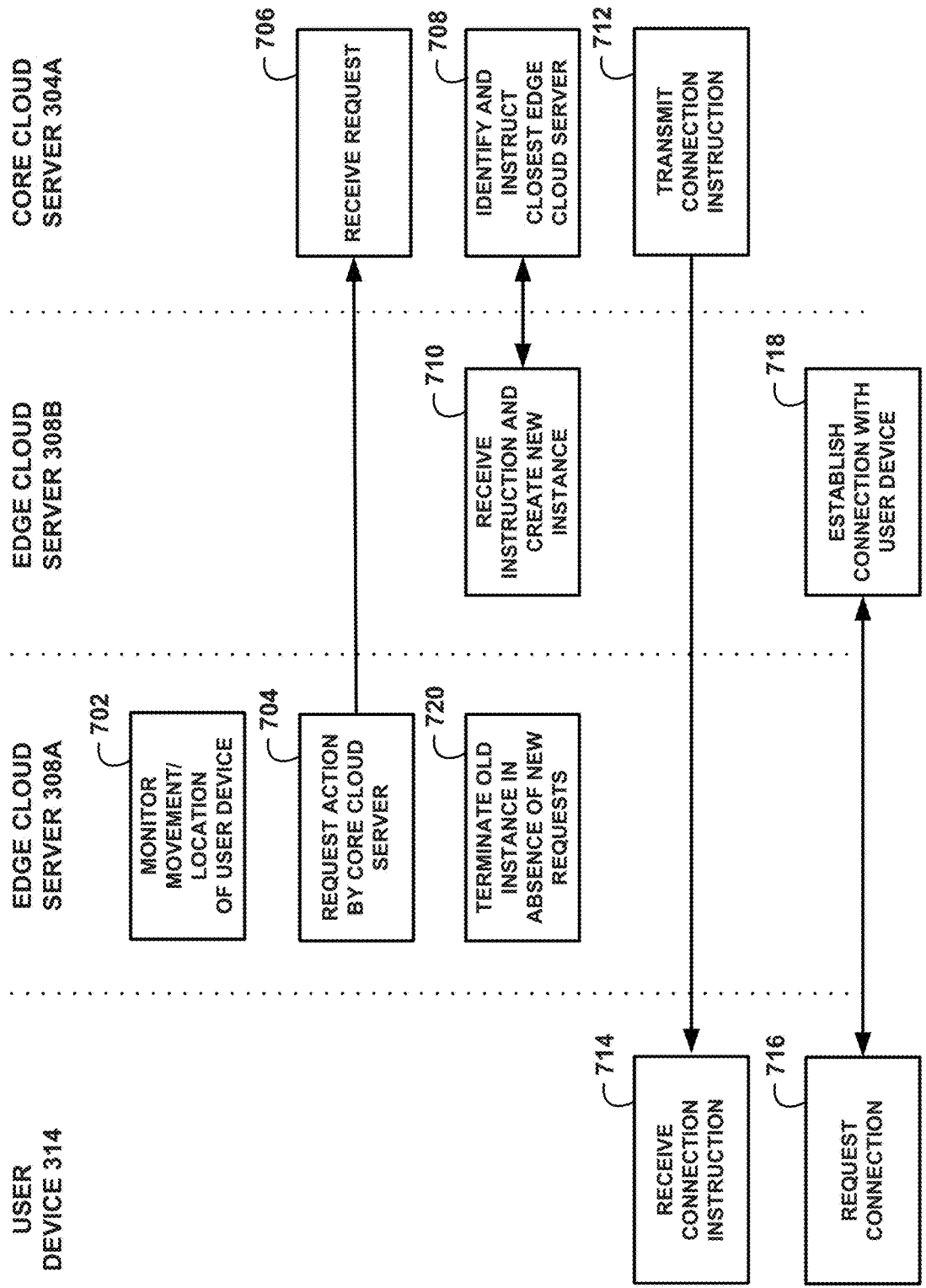
Figure 8:
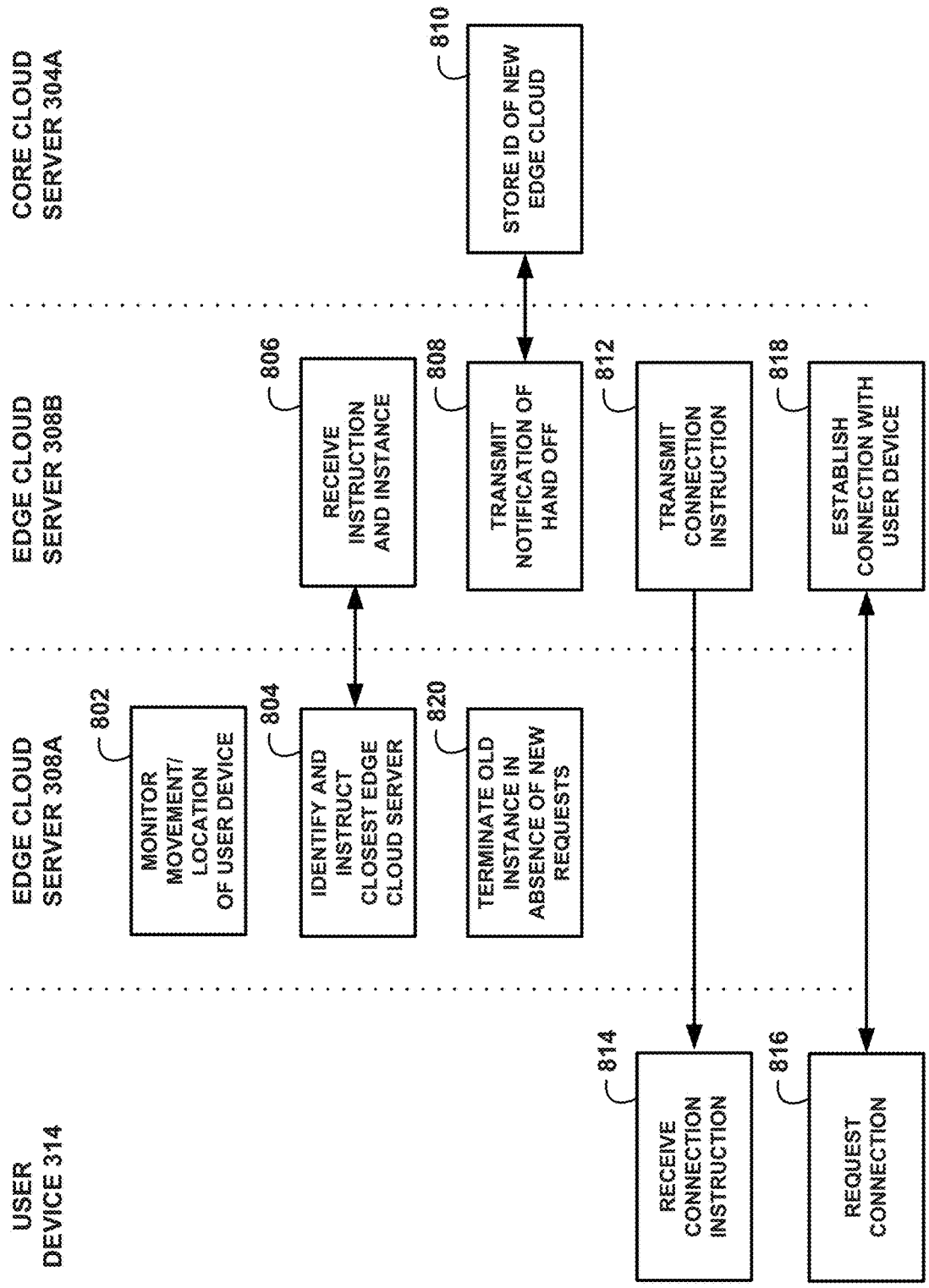

FIG. 8 provides another device instance migration process flow overview in accordance with one or more embodiments of the present disclosure. In contrast to FIG. 7, a current edge cloud server (e.g., the edge cloud server 308A) can identify a new edge cloud server (e.g., the edge cloud server 308B) and instruct the edge cloud server 308B to create a local device instance. By way of a non-limiting example, the edge cloud server 308A can transmit data stored in its local device instance to the edge cloud server 308B so that edge cloud server 308B can create its local device instance.

In the example of FIG. 8, block 802 corresponds to block 702 (of FIG. 7). At block 804 (of FIG. 8), the edge cloud server 308A identifies the edge cloud server 308B. As with the core cloud server 304A, the edge cloud server 308A may use the latest geographic location received from the user device 314 and mobile network handoff information to identify another the edge cloud server 308B. And, at block 804, the edge cloud server 308A instructs the identified edge cloud server (e.g., the edge cloud server 308B) to create a local device instance for the user device 314. The edge cloud server 308A also transmits the token for the user device 314 so that the edge cloud server 308B can associate the token and its local device instance created for the user device 314.

At block 808, the edge cloud server 308B notifies the core cloud server 304A that it is now the edge cloud server 308B servicing the user device 314. The notification includes the token received from the edge cloud server 308A. At block 810, the core cloud server 304A receives the notification and makes note of the change in edge cloud servers for the user device 314. The core cloud server 304A can generate a new token for the user device 314 (as in FIG. 7), and transmit the new token to the edge cloud server 308B.

In some cases, the core cloud server 304A instructs the edge cloud server 308B to alter its local device instance (e.g., increase or decrease compute and/or memory resources, add or remove one or more applications, etc.). The change can be due to a difference in capabilities between the edge cloud servers 308A and 308B, an upgrade selected by the user, etc.

At block 812, the edge cloud server 308B transmits a connection instruction to the user device 314 identifying it (e.g., with a URL of the server 308B) as the current edge cloud server and instructing the user device 314 to redirect its communications from the edge cloud server 308A (e.g., the current and soon to be previous edge cloud server) to the edge cloud server 308B (e.g., the new edge cloud server and soon to be the current edge cloud server). The edge cloud server 308B can send the token (e.g., the new token) to the user device 314 at block 812.

At block 814, the user device 314 receives the instruction. In response and at block 816, the use device 314 transmits a connection request with its token (e.g., the token received from the edge cloud server 308B at block 814) to the edge cloud server 308B. At block 818, the edge cloud server 308B establishes the connection and provides a response to the user device 314. At this point, the edge cloud server 308B is established as the edge cloud server servicing the user device 314 using the local device instance created by the edge cloud server 308B at block 806. The user device 314 need no longer communicate with the edge cloud server 308A.

As discussed, eventually (e.g., after a threshold time), the edge cloud server 308A can terminate its connection with the user device 314 and remove its local device instance associated with the user device 314. The timing of the termination operation can be based on an amount of time since the edge cloud server 308A has received a request from the user device 314. The absence of requests from the user device 314 for a threshold period of time may trigger the termination of the connection and the removal of the local device instance. In accordance with one or more embodiments, as part of the termination operation, the edge cloud server 308A can send some or all of the local device instance to the core cloud server 308A for storage and or synchronization purposes.

In the examples shown in FIGS. 7 and 8, migration of a local device instance from one edge cloud server (e.g., the edge cloud server 308A) to another edge cloud server (e.g., the edge cloud server 308B) can be prompted by the physical movement of the user device 314. As discussed herein, the identification (e.g., at block 708 or 804) of the other edge cloud server ((e.g., the edge cloud server 308B) in response to such movement by the user device 314 can take QoS into consideration, such that the edge cloud server 308B can be determined to provide at least a threshold QoS before it is selected as the next edge cloud server to host the local device instance for user device 314 in response to the detected movement of the user device 314. As discussed herein, the edge cloud server 308B can be one of a number of candidate edge cloud servers being considered for the migration of the local device instance.

In accordance with one or more embodiments, the migration of the local device instance from a current edge cloud server (e.g., the edge cloud server 308A) to another edge cloud server (e.g., the edge cloud server 308B) can occur even in the absence of physical movement of the user device 314 to a new geographic location (e.g., a new geographic location serviced by another cellular base station). As discussed herein, in response to a determination (e.g., at block 702 or 802) that the current edge cloud server (e.g., the edge cloud server 308A) is unable to provide at least a threshold QoS, another edge cloud server (e.g., the edge cloud server 308B) can be identified (e.g., at block 708 or 804) to host the local device instance for the user device 314 even in the absence of a change in geographic location. In accordance with one or more embodiments, blocks 702 (of FIG. 7) and 802 (of FIG. 8) can monitor the QoS provided by edge cloud server 308A. The monitoring can be performed by the edge cloud server 308A alone or in combination with the core cloud server 304A using QoS-related information (e.g., a current snapshot) indicating the current load and/or QoS indicators corresponding to the edge cloud server 308A (e.g., the information maintained by the edge cloud server 308A and/or the core cloud server 304A).

In accordance with one or more embodiments, an operation involving migrating the local device instance shown in FIGS. 7 and 8 can be initiated in response to a determination that the edge cloud server 308A is unable to maintain at least a threshold QoS for the user of user device 314 and the corresponding local device instance. The identification of the edge cloud server 308B (e.g., at block 708 or 804) can involve a determination (e.g., using QoS-related information indicating the current load and/or QoS indicators corresponding to the edge cloud server 308B) that the edge cloud server 308B is capable of providing at least a threshold QoS for the local device instance corresponding to the user device 314. As discussed herein, the edge cloud server 308B can be one of a number of candidate edge cloud servers being considered for the migration of the local device instance.

In the example of FIG. 8, the edge cloud server 308A can use QoS-related information indicating the current load and/or QoS indicators corresponding to the edge cloud server 308B in identifying the edge cloud server 308B at block 804. By way of some non-limiting examples, the QoS-related information indicating the current load and/or QoS indicators corresponding to the edge cloud server 308B can be obtained by the edge cloud server 308A from the edge cloud server 308B and/or the core cloud server 304A. The information can be requested (e.g., pulled) by the edge cloud server 308A from the edge cloud server 308B and/or the core cloud server 304A and/or pushed (e.g., periodically pushed) to the edge cloud server 308A from the edge cloud server 308B and/or the core cloud server 304A.

FIG. 9 provides a schematic diagram illustrating an example of a cloud server (e.g., the core cloud servers 304A-304N, the edge cloud servers 308A-308B) in accordance with some embodiments of the present disclosure. In the example, cloud server 902 comprises hardware 904, a host operating system (or OS) 906, an intermediate layer 908 and a number of device instances 910A-910N. Where cloud server 902 is a core cloud server (e.g., the core cloud servers 304A-304N), device instances 910A-910N are persistent core device instances. Where cloud server 902 is an edge cloud server (e.g., edge cloud servers 308A0308B), the device instances 910A-910N are local device instances. Each of device instances 910A-910N corresponds to a user (a user of user device 314).

In the example of FIG. 902, the intermediate layer 908 can depend on the type of device instances 910A-910N. For example, in a case that the device instances 910A-910N are virtual machines, the intermediate layer 908 can comprise a virtual machine monitor (or hypervisor), that runs the device instances 910A-910N as virtual machines. As a virtual machine, each of device instances 910A-910N can have an operating system (or guest operating system), binaries and libraries and a number of application(s). Examples of applications include electronic mail, electronic messaging, word processing, spreadsheet, browser, etc. applications.

As another example, each of the device instances 910A-910N can be a container. In such a case, intermediate layer 908 can be a container runtime engine. As a container, each of the device instances 910A-910N can comprise binaries and libraries and a number of applications. A container need not include a guest operating system, which reduces the footprint for a device instance.

In addition, each device instance 910A-910N has a specific configuration which indicates the compute and memory resource level associated with the instance. The memory can comprise random access memory as well as persistent memory (e.g., disk space). In accordance with one or more embodiments, the user may select a configuration when the user makes a request to create a new device instance (e.g., at block 402 of FIG. 4). In addition, the user may elect to upgrade or downgrade the configuration (e.g., when the user requests access to an existing device instance at block 402 of FIG. 4). In accordance with one or more embodiments, the user may be presented with a number of configuration tiers, each with a specific resource level. The user may also be able to select the applications that the user would like to be able to use via a selected device instance. In accordance with one or more embodiments, a pay-per-use model may be used where users pay for data usage.

Considering the growing mobile user base, the systems and methods disclosed herein provide cloud hosted device instances that can focus on any type of user, including those users who don't want to spend much to buy high end phones but want higher storage and faster processing capabilities. At the same time, the cloud hosted device instance capability disclosed herein provide a desirable device backup system, which can be used to avoid setting up a new user after every purchase or when a user loses a device.

In accordance with one or more embodiments, persistent memory associated with a persistent core device instance can store an image of the user device 314, and the stored device image can be restored on the user device 314 or a new user device 314. In addition and since the user device 314 has access to a device instance and its corresponding compute and memory resources, migration to a new user device 314 is further enabled. With the cloud client installed on the new user device 314, the user is able to access the cloud resources.

Embodiments of the present disclosure can be implemented using any generation cellular technology. The 5th generation technology and its mobile edge computing infrastructure can be used with the disclosed systems and methods for reliability and low latency. The 5th generation cellular network can enable seamless interaction capabilities with a device instance.

The 5th generation cellular network can facilitate minimizing latency and optimizing reliability to achieve significant savings in network communication resources by utilizing application components at the edge, close to the devices to efficiently meet application and service needs for low latency and reliability. It should be apparent that the novel systems and methods disclosed herein for providing cloud hosted device instances may use other cellular network generations as well.

FIG. 10 is a flowchart illustrating steps performed in accordance with some embodiments of the present disclosure. At 1002, a device instance request is received from a user device (e.g., user device 314). In the example, the request is received by a core cloud server (e.g., core cloud server 304A). The request can include a request to create a new device instance or to access an existing device instance. In the case of a new device instance, the request includes configuration information for the new device instance. By way of a non-limiting example, the request for a new device instance can be received via a web page displaying configuration options for a device instance. The web page can provide a number of different resource levels (e.g., a number of different compute and memory configurations, applications, etc.).

The request received at step 1002 can include information about the user as part of a user registration, such as the user's name, address, login (e.g., online username and password), as well as device information, such as an international mobile equipment identity (IMEI), media access control (MAC) address, geographic location, cell phone number, etc. In addition, the device instance creation request can identify a requested resource level, which can indicate a level (or tier) of compute and memory resource requested by the user.

At step 1004, which can be performed by core cloud server 304A, a persistent core device instance is created in accordance with the configuration information received with the response. In addition, a unique identifier (or token) associated with the user and user device 314 is generated and the persistent core device instance is associated with the unique identifier. By way of a non-limiting example, the unique identifier (or token) is a random hash of information, where such information can include one or more of the IMEI, MAC address, cell phone number, etc. of the user device 314.

At step 1006, the core cloud server 304A causes a local device instance to be created at an edge cloud server (e.g., the edge cloud server 308A). In accordance with at least one embodiment, the core cloud server 304A identifies an edge cloud server (e.g., edge cloud server 308A), and transmits the token and an instruction instructing the edge cloud server 308A to create the local device instance associated with the token. The core cloud server 304A can identify the edge cloud server 308A using information received with the request (e.g., information identifying edge cloud server 308A). By way of a non-limiting example, the request received at block 404 can indicate which cellular base station (e.g., cellular base station 306A or 306B) was used by the user device 314 to communicate the request at block 402. By way of another non-limiting example, the request received at block 404 can include the device's geographic location at the time the request was transmitted at block 402.

At step 1008, the core cloud server 304A transmits a response to the user device 314 with the token associated with the local and persistent core device instances and an instruction to connect with the edge cloud server 308A. The information identifying the edge cloud server 308A can comprise a URL of the edge cloud server 308A, for example. The connection instruction can be communicated to the user device 314 via network 310 and cellular base station 306A, for example.

As discussed herein, the user device 314 receives the connection instruction and transmits a connection request with the token to edge cloud server 308A (e.g., using the URL of the edge cloud server 308A received from core cloud server 304A). The edge cloud server 308A receives the connection request from user device 314, uses the token included with the received connection request to associate user device 314 with the local device instance. The edge cloud server 308A can transmit a response indicating the result of the request (e.g., a successful connection). If successful, the compute and memory resources of the local device instance at the edge cloud server 308A (and the persistent core device instance at the core cloud server 304A) are available to the user device 314 and the user device 314 can commence interaction with the edge cloud server 308A. In accordance with one or more embodiments, the core cloud server 304A can be requested to process some or all of a request received from the user device 314.

At block 1010, the core cloud server 304A can receive a request to update the persistent core device instance corresponding to the user device 314. For example, the request can be received from the edge cloud server 308A in response to changes made to data being used/stored by the local device instance. For example, the data can be transient or persistent data being used by the local device instance. The request can identify the updates to be made as well as the token identifying the persistent core device instance. Alternatively or in addition, the core cloud server 304A can identify updates to be made to the persistent core device instance as a result of the communication from the edge cloud server 308A.

At step 1012, the core cloud server 304A can use the token to identify the persistent core device instance associated with the user device 314, make the updates indicated by the request, and then return a response to the edge cloud server 308A. The response can include any updates that the edge cloud server 308A can need to make to the local device instance to maintain synchronicity.

As a result, the persistent core device instance (corresponding to the user device 314) reflects any changes made to the local device instance (corresponding to the user device 314) at the edge cloud server 308A, and vice versa. Synchronicity facilitates migration (discussed herein) of the local device instance to another edge cloud server (e.g., the edge cloud server 308B) in response to the physical movement by the user device 314 from one geographic area serviced by one edge cloud server (e.g., the edge cloud server 308A) to another geographic area serviced by another edge cloud server (e.g., the edge cloud server 308B). In addition, synchronicity facilitates persistence of a device instance associated with the user device 314. In accordance with at least one embodiment, the core cloud 302 maintains a core device instance that is persistent and reflects any updates made by an edge cloud server to a local device instance.

At step 1014, the core cloud server 304A responds to movement of the user device from one geographic area serviced by a cellular base station comprising the edge cloud server (e.g., the edge cloud server 308A) currently servicing the user device 314 using a local device instance to another geographic area serviced by another cellular base station comprising another edge cloud server.

As discussed herein, the core cloud server 304A can use information identifying the latest physical geographic location of the user device 314 to identify another edge cloud server (e.g., the edge cloud server 308B) and instruct the edge cloud server 308B to create a local device instance for the user device 314. Since the persistent core device instance is in synchronicity with the local device instance at the edge cloud server 308A, the core cloud server 304A can use the persistent core device instance to facilitate creation of the local device instance at the edge cloud server 308B.

At step 1014, the core cloud server 304A can transmit an instruction with a unique identifier (e.g., a token) for the user device 314 to the edge cloud server 308A to create a local device instance. The core cloud server 304A can transmit a connection instruction to the user device 314 identifying the edge cloud server 308B (e.g., with a URL of the server 308B) and instructing the user device 314 to redirect its communications from the edge cloud server 308A (e.g., the current and soon to be previous edge cloud server) to the edge cloud server 308B (e.g., the new edge cloud server and soon to be the current edge cloud server). The core cloud server 304A can send the token associated with the local device instance at the edge cloud server 308B to the user device 314.

In response to the instruction from the core cloud server 304A, the edge cloud server 308B creates a local device instance for the user device 314, associates the local device instance with the received token and provides a response to the core cloud server 304A indicating the success of the operation. In addition and in response to the instruction from the core cloud server 304A, transmits a connection request with the token received from the core cloud server 304A to the edge cloud server 308B, such that the edge cloud server 308B establishes the connection and provides a response to the user device 314. At this point, the edge cloud server 308B is established as the edge cloud server servicing the user device 314 using the local device instance created by the edge cloud server 308B. The user device 314 no longer needs to communicate with the edge cloud server 308A and the edge cloud server 308A can terminate its connection with the user device 314 and remove its local device instance associated with the user device 314, as discussed herein.

In accordance with at least one or more embodiments, the migration can be handled between the edge cloud servers 308A and 308B (e.g., as described in connection with FIG. 8). In such a case, the core cloud server 304A can respond (at step 1014) to a notification from the edge cloud server 308B indicating that it is now the edge cloud server 308B servicing the user device 314. The notification includes a token associated with the user device 314 and the corresponding persistent core device instance. In response, the core cloud server 304A can make a note of the change in edge cloud servers for the user device 314. The core cloud server 304A can generate a new token for the user device 314 (e.g., as discussed in connection with FIG. 7), and transmit the new token to the edge cloud server 308B.

As shown in FIG. 11, internal architecture 1100 of a computing device(s), computing system, computing platform, user devices, set-top box, smart TV and the like includes one or more processing units, processors, or processing cores, (also referred to herein as CPUs) 1112, which interface with at least one computer bus 1102. Also interfacing with computer bus 1102 are computer-readable medium, or media, 1106, network interface 1114, memory 1104, e.g., random access memory (RAM), run-time transient memory, read only memory (ROM), media disk drive interface 1120 as an interface for a drive that can read and/or write to media including removable media such as floppy, CD-ROM, DVD, media, display interface 1110 as interface for a monitor or other display device, keyboard interface 1116 as interface for a keyboard, pointing device interface 1118 as an interface for a mouse or other pointing device, and miscellaneous other interfaces not shown individually, such as parallel and serial port interfaces and a universal serial bus (USB) interface.

Memory 1104 interfaces with computer bus 1102 so as to provide information stored in memory 1104 to CPU 1112 during execution of software programs such as an operating system, application programs, device drivers, and software modules that comprise program code, and/or computer executable process steps, incorporating functionality described herein, e.g., one or more of process flows described herein. CPU 1112 first loads computer executable process steps from storage, e.g., memory 1104, computer readable storage medium/media 1106, removable media drive, and/or other storage device. CPU 1112 can then execute the stored process steps in order to execute the loaded computer-executable process steps. Stored data, e.g., data stored by a storage device, can be accessed by CPU 1112 during the execution of computer-executable process steps.

Persistent storage, e.g., medium/media 1106, can be used to store an operating system and one or more application programs. Persistent storage can also be used to store device drivers, such as one or more of a digital camera driver, monitor driver, printer driver, scanner driver, or other device drivers, web pages, content files, playlists and other files.

Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 1128 typically provides information communication using transmission media through one or more networks to other devices that use or process the information. For example, network link 1128 may provide a connection through local network 1124 to a host computer 1126 or to equipment operated by a Network or Internet Service Provider (ISP) 1130. ISP equipment in turn provides data communication services through the public, worldwide packet-switching communication network of networks now commonly referred to as the Internet 1132.

A computer called a server host 1134 connected to the Internet 1132 hosts a process that provides a service in response to information received over the Internet 1132. For example, server host 1134 hosts a process that provides information representing video data for presentation at display 1110. It is contemplated that the components of system 1100 can be deployed in various configurations within other computer systems, e.g., host and server.

At least some embodiments of the present disclosure are related to the use of computer system 1100 for implementing some or all of the techniques described herein. According to one embodiment, those techniques are performed by computer system 1100 in response to processing unit 1112 executing one or more sequences of one or more processor instructions contained in memory 1104. Such instructions, also called computer instructions, software and program code, may be read into memory 1104 from another computer-readable medium 1106 such as storage device or network link. Execution of the sequences of instructions contained in memory 1104 causes processing unit 1112 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 1100. Computer system 1100 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 1102 as it is received, or may be stored in memory 1104 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

The invention claimed is:

1. A method comprising:
    receiving, at a server computer, a device instance creation request in connection with a user device, the request comprising configuration information;
    using, by the server computer, the configuration information to create a persistent core device instance associated with the user device;
    identifying, by the server computer and using information indicating a geographic location of the user device, an edge cloud server of a cellular base station associated with a geographic area including the geographic location of the user device;
    transmitting, by the server computer and to the identified edge cloud server, an instruction to use the configuration information to instantiate a local device instance associated with the user device;

transmitting, by the server computer and to user device, an instruction to make a connection with the identified edge cloud server;
receiving, by the server computer and from the edge cloud server, a synchronization request comprising information identifying a change in the local device instance;
updating, by the server computer, the persistent core device instance in accordance with the information received from the edge cloud server; and
responding, by the server computer, to a change in condition indicating an edge cloud server change for the user device.

2. The method of claim 1, further comprising:
generating, by the server computer, a unique identifier for the user device, the unique identifier corresponding to the local device instance and the persistent core device instance;
transmitting, by the server computer, the unique identifier to the identified edge cloud server and the user device.

3. The method of claim 2, the unique identifier comprising a random hash of information identifying the user device.

4. The method of claim 1, further comprising:
receiving, by the server computer, information indicative of an action taken at the user device;
performing, by the server computer, at least one task using the persistent core device instance in response to the received information; and
causing, by the server computer, a response to the action to be transmitted to the user device.

5. The method of claim 1, the persistent core device instance and the local device instance comprising compute and memory resources for use in servicing requests from the user device.

6. The method of claim 1, the responding further comprising:
receiving, by the server computer, geographic location information indicating a current geographic location of the user device;
making, by the server computer using the received geographic location information, a determination that there is a change in geographic location of the user device, the determination further comprising a determination that the current geographic location of the user device causes the user device to be outside a geographic area serviced by the identified edge cloud server;
identifying, by the server computer and using the current geographic location of the user device, a latest edge cloud server;
instructing, by the server computer, the latest edge cloud server to instantiate a corresponding local device instance; and
instructing, by the sever computer, the user device to commence interaction with the latest edge cloud server.

7. The method of claim 6, the identifying the latest edge cloud server further comprising determining that the latest edge cloud server is able to provide at least a threshold quality of service in connection with the local device instance.

8. The method of claim 1, the responding further comprising:
receiving, by the server computer, information indicating that another edge cloud server is servicing the user device; and
storing, by the server computer, the change in the identified edge cloud server in accordance with the received information.

9. The method of claim 1, the responding further comprising:
receiving, by the server computer, information indicating that the edge cloud server is unable to provide at least a threshold quality of service in connection with local device instance;
identifying, by the server computer, a latest edge cloud server using quality of service information associated with the latest edge cloud server;
instructing, by the server computer, the latest edge cloud server to instantiate a corresponding local device instance; and
instructing, by the sever computer, the user device to commence interaction with the latest edge cloud server.

10. The method of claim 1, the information identifying a geographic location of the user device comprising information identifying the cellular base station.

11. The method of claim 1, the information identifying a geographic location of the user device comprising global positioning information.

12. The method of claim 1, the configuration information comprising information identifying a compute and memory resource level.

13. The method of claim 1, the configuration information comprising information identifying a number of applications.

14. A non-transitory computer-readable storage medium tangibly encoded with computer-executable instructions that when executed by a processor associated with a computing device perform a method comprising:
receiving a device instance creation request in connection with a user device, the request comprising configuration information;
using the configuration information to create a persistent core device instance associated with the user device;
identifying, using information indicating a geographic location of the user device, an edge cloud server of a cellular base station associated with a geographic area including the geographic location of the user device;
transmitting, to the identified edge cloud server, an instruction to use the configuration information to instantiate a local device associated with the user device;
transmitting, to user device, an instruction to make a connection with the identified edge cloud server;
receiving, from the edge cloud server, a synchronization request comprising information identifying a change in the local device instance;
updating the persistent core device instance in accordance with the information received from the edge cloud server; and
responding to a change in condition indicating an edge cloud server change for the user device.

15. The non-transitory computer-readable storage medium of claim 14, further comprising:
generating a unique identifier for the user device, the unique identifier corresponding to the local device instance and the persistent core device instance;
transmitting the unique identifier to the identified edge cloud server and the user device.

16. The non-transitory computer-readable storage medium of claim 14, further comprising:
receiving information indicative of an action taken at the user device;
performing at least one task using the persistent core device instance in response to the received information; and causing a response to the action to be transmitted to the user device.

17. The non-transitory computer-readable storage medium of claim 14, further comprising:
receiving geographic location information indicating a current geographic location of the user device;
making, using the received geographic location information, a determination that there is a change in geographic location of the user device, the determination further comprising a determination that the current geographic location of the user device causes the user device to be outside a geographic area serviced by the identified edge cloud server;
identifying, using the current geographic location of the user device, a latest edge cloud server;
instructing the latest edge cloud to instantiate a corresponding local device instance; and
instructing the user device to commence interaction with the latest edge cloud server.

18. The non-transitory computer-readable storage medium of 17, the identifying the latest edge cloud server further comprising determining that the latest edge cloud server is able to provide at least a threshold quality of service in connection with the local device instance.

19. The non-transitory computer-readable storage medium of claim 14, the responding further comprising:
receiving information indicating that the edge cloud server is unable to provide at least a threshold quality of service in connection with local device instance;
identifying a latest edge cloud server using quality of service information associated with the latest edge cloud server;
instructing the latest edge cloud server to instantiate a corresponding local device instance; and
instructing the user device to commence interaction with the latest edge cloud server.

20. A computing device comprising:
a processor;
a non-transitory storage medium for tangibly storing thereon program logic for execution by the processor, the program logic comprising:
receiving logic executed by the processor for receiving a device instance creation request in connection with a user device, the request comprising configuration information;
using logic executed by the processor for using the configuration information to create a persistent core device instance associated with the user device;
identifying logic executed by the processor for identifying, using information indicating a geographic location of the user device, an edge cloud server of a cellular base station associated with a geographic area including the geographic location of the user device;
transmitting logic executed by the processor for transmitting, to the identified edge cloud server, an instruction to use the configuration information to instantiate a local device instance associated with the user device;
transmitting logic executed by the processor for transmitting, to user device, an instruction to make a connection with the identified edge cloud server;
receiving logic executed by the processor for receiving, from the edge cloud server, a synchronization request comprising information identifying a change in the local device instance;
updating logic executed by the processor for updating the persistent core device instance in accordance with the information received from the edge cloud server; and
responding logic executed by the processor for responding to a change in condition indicating an edge cloud server change for the user device.

* * * * *